US008530227B2

(12) United States Patent
Star et al.

(10) Patent No.: US 8,530,227 B2

(45) Date of Patent: Sep. 10, 2013

(54) DEGRADATION OF NANOMATERIALS

(75) Inventors: Alexander Star, Pittsburgh, PA (US); Valerian E. Kagan, Pittsburgh, PA (US); Brett Lee Allen, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 798 days.

(21) Appl. No.: 12/603,104

(22) Filed: Oct. 21, 2009

(65) Prior Publication Data

US 2010/0190239 A1 Jul. 29, 2010

Related U.S. Application Data

(60) Provisional application No. 61/107,340, filed on Oct. 21, 2008.

(51) Int. Cl.
*C12S 99/00* (2010.01)
*A62D 3/02* (2007.01)

(52) U.S. Cl.
USPC ........ 435/262; 435/262.5; 588/320; 977/841; 977/842

(58) Field of Classification Search
USPC .............. 435/262, 262.5; 588/313, 319, 320; 977/742, 841, 842
See application file for complete search history.

(56) References Cited

U.S. PATENT DOCUMENTS

| | | | | |
|---|---|---|---|---|
| 3,884,836 | A * | 5/1975 | Kuhl et al. | 502/241 |
| 4,588,506 | A * | 5/1986 | Raymond et al. | 210/606 |
| 6,824,645 | B2 * | 11/2004 | Jaschinski et al. | 162/9 |
| 2009/0250404 | A1 * | 10/2009 | Berkowitz et al. | 210/721 |

OTHER PUBLICATIONS

Miyata et al. "Selective Oxidation of Semiconducting Single-Wall Carbon Nanotubes by Hydrogen Peroxide." J. Physical Chem. B Letters, vol. 110 (Dec. 13, 2005), pp. 25-29.*

White, C. T.; Mintmire, J. W.; Fundamental properties of single-walled carbon nanotubes. J. Phys. Chem. B 2005, 109, 52-65.

Jia, G.; Wang, H.; Yan, L.; Wang, X; Pei, R.; Yan, T.; Zhao, Y.; Guo, X.; Cytotoxicity of carbon nanomaterials single-walled nanotube, multi-wall nanotube, and fullerene. Environ. Sci. Tech. 2005, 39, 1378-1383.

Magrez, A.; Kasas, S.; Salicio, V.; Pasquier, N.; Seo, J. W.; Celio, M.; Catsicas, S.; Schwaller, B Forro, L. Cellular toxicity of carbon based nanomaterials. Nano Lett. 2006, 6,No. 6 1121-1125.

Wu, W.; Wiexkowski, S. et al.; Targeted delivery of Amphotericin B to cells using functionalized carbon nanotubes. Angew. Chem. Int. Ed. 2005, 44, 6358-6362.

Kam, N. W.; Liu, Z.; Dai, H. Functionalization of carbon nanotubes via cleavable disulfide bonds for efficient intracellular delivery of siRNA and potent gene silencing. J. Amer. Chem. Soc. 2005, 127, 12492-12493.

Shvedova, A. A.; Kisin, E. R.; Mercer, R.; Murray, A. R. et al.; Unusual inflammatory and fibrogenic pulmonary responses to single-walled carbon nanotubes in mice. Amer. J. Physiol.: Lung, 2005, 289, L698-L708.

Muller, J.; Huaux, F.; Moreau, N.; Misson, P. et al.; Respiratory toxicity of multi-wall carbon nanotubes. Tox. Appl. Pharm. 2005, 207, 221-231.

Ding, L.; Stilwell, J.; Zhang, T. et al. ; Molecular characterization of the cytotoxic mechanism of multiwall carbon nanotubes and nano-onions on human skin fibroblast. Nano Lett. 2005, 5, 2448-2464.

Poland, C. A.; Duffin, R.; Kinloch, I.; Maynard, A. et al.; Carbon nanotubes introduced into the abdominal cavity of mice show asbestos-like pathogenicity in a pilot study. Nature Nano. 2008, 3, 423-428.

Tasis, D.; Tagmatarchis, N.; Bianco, A.; Prato, M.; Chemistry of carbon nanotubes. Chem. Rev. 2006, 106, 1105-1136.

Zhao, W.; Song, C.; Pehrsson, P. E. Water-soluble and optically pH-sensitive singlewalled carbon nanotubes from surface modification. J. Amer. Chem. Soc. 2002, 124, 12418-12419.

Chiang, I. W.; Brinson, B. E.et al.; Purification and characterization of single-walled carbon nanotubes. J. Phys. Chem. B 2001, 105, 1157-1161.

Balavoine, F.; Schultz, P.; RichardRichard, C.et al. ; Helical crystallization of proteins on carbon nanotubes: a first step towards the development of new biosensors. Angew. Chem., Int. Ed. 1999, 38, 1912-1915.

Harris, J. L.; Craik, C. S. Engineering enzyme specificity. Curr. Opin. Chem. Biol. 1998, 2, 127-132.

Hayashi, Y.; Yamazaki, I. The oxidation-reduction potentials of compound I/compound II and compound II/ferric couples of horseradish peroxidases A2 and C. J. Biol. Chem. 1979, 254, 9101-9106.

Filizola, M.; Loew, G. H. Role of protein environment in horseradish peroxidase compound I formation: molecular dynamics simulations of horseradish peroxidase-HOOH complex. J. Am. Chem. Soc. 2000, 122, 18-25.

Mohamed, S. A.; Aly, A. S.; Mohamed, T. M.; Salah, H. A. Immobilization of horseradish peroxidase on nonwoven polyester fabric coated with chitosan. Appl.Biochem. Biotechnol. 2008, 144, 169-179.

Wei, Z.; Kondratenko, M. et al. ; Rectifying diodes from asymmetrically functionalized single-wall carbon nanotubes. J. Amer. Chem. Soc. 2006, 128, 3134-3135.

Hunt, J. P.; Taube, H. The photochemical decomposition of hydrogen peroxide. Quantum yields, tracer and fractionation effects. J. Am. Chem. Soc. 1952, 74, 5999-6002.

Basova, L. V.; Kurnikov, I. V.; WangWang, L. et al. ; Cardiolipin switch in mitochondria: shutting off the reduction of cytochrome c and turning on the peroxidase activity. Biochem. 2007, 46, 3423-3434.

(Continued)

*Primary Examiner* — William H Beisner

(74) *Attorney, Agent, or Firm* — Bartony & Associates, LLC

(57) ABSTRACT

A method of degrading carbon nanomaterials includes mixing the carbon nanomaterials with a composition comprising a peroxide substrate and at least one catalyst selected from the group of an enzyme and an enzyme analog. The peroxide substrate undergoes a reaction in the presence of the catalyst to produce an agent interactive with the nanotubes to degrade the carbon nanomaterials. The peroxide substrate can, for example, be hydrogen peroxide or an organic peroxide.

19 Claims, 15 Drawing Sheets

(56) References Cited

OTHER PUBLICATIONS

Palwai, N. R.; Martyn, D. E. et al. ; Retention of biological activity and near-infrared absorbance upon adsorption of horseradish peroxidase on single-walled carbon nanotubes. Nanotech. 2007, 18, 235601-1-235601-5.

Asuri, P.; Bale, S. S.; Pangule, R. C. et al. ; Structure, function, and stability of enzymes covalently attached to single-walled carbon nanotubes. Langmuir, 2007, 23, 12318-12321.

Schmidt, A.; Schumacher, J. T. et al. ; Mechanistic and molecular investigations on stabilization of horseradish peroxidase C. Anal. Chem. 2002, 74, 3037-3045.

Berglund, G. I.; Carlsson, G. H. et al. ; The catalytic pathway of horseradish peroxidase at high resolution. Nature 2002, 417, 463-468.

Rao, A. M.; Richter, E.; Bandow, S.; Chase, B. et al. ; Diameter-selective Raman scattering from vibrational modes in carbon nanotubes. Science 1997, 275, 187-191.

Allen, B. L.; Kichambare, P. D.; Gou, P.; Vlasova, I. I.; Kapralov, A. A.; Konduru, N.; Kagan, V. E.; Star, A. Biodegradation of single-walled carbon nanotubes through enzymatic catalysis, Nano Lett. 2008, 8, No. 11, 3899-3903.

Chen, J.; Hamon, M. A.; Hu, H. et al.; Solution properties of single-walled carbon nanotubes. Science 1998, 282, 95-98.

Wang, Y.; Qball, Z.; Mitra, S. Rapidly functionalized, water-dispersed carbon nanotubes at high concentration. J. Amer. Chem. Soc. 2006, 128, 95-99.

Tsutsui, K.; Mueller, G. C. Affinity chromatography of heme-binding proteins: an improved method for the synthesis of hemin-agarose. Anal. Biochem. 1982, 121, 244-250.

Akasaka, R.; Mashing, T.; Hydroxylation of benzene by horseradish peroxidase and immobilized horseradish peroxidase in an organic solvent. Bioorg. Med. Chem. Lett. 1995, 5, 1861-1864.

Herzog, E.; Casey, A.; Lyng F. M.; A new approach to the toxicity testing of carbon-based nanomaterials—the clonogenic assay. Toxicol. Lett. 2008, 174, 49-60.

Geiser, M.; Casaulta, M.et al.; The role of macrophages in the clearance of inhaled ultrafine titanium dioxide particles. Am. J. Respir. Cell Mol. Biol. 2008, 38, 371-376.

Ajayan P. M., et al.; Single-Walled Carbon Nanotube Polymer Composites: Strength andWeakness, Adv. Mater. 2000, 12, 750-753.

Bianco, A., et al.; Applications of carbon nanotubes in drug delivery, Curr. Opin. Chem. Biol. 2005, 9, 674-679.

Kosynkin, D. V.et al.; Longitudinal unzipping of carbon nanotubes to form graphene nanoribbons; Nature 2009, 458, 872-876.

Kuznetsova, A., et al; Oxygen-Containing Functional Groups on Single-Wall Carbon Nanotubes: NEXAFS and Vibrational Spectroscopic Studies; J. Am. Chem. Soc. 2001, 123, 10699-10704.

* cited by examiner

1
MW: 106.1

2
MW: 110.1

5
MW: 108.1

6
MW: 126.1

3
MW: 132.1

4
MW: 212.2

7
MW: 148.1

8
MW: 228.2

DEGRADATION OF NANOMATERIALS

CROSS-REFERENCE TO RELATED APPLICATIONS

This application claims benefit of U.S. Provisional Patent Application Ser. No. 61/107,340, filed Oct. 21, 2008, the disclosure of which is incorporated herein by reference.

BACKGROUND

The terms used herein are not intended to be limited to any particular narrow interpretation unless clearly stated otherwise in this document. The disclosure of all references cited herein are incorporated by reference.

In the past few years, the scientific world has made vast strides in developing applications for carbon nanomaterials (for example, nanotubes). Following suit, manufacturers and commercial plants have increased production of carbon nanotubes and other carbon nanomaterials to meet the increasing demand.

Carbon nanomaterials such as carbon nanotubes have, however, exhibited toxic effects, resulting in an increased risk in handling and use of these materials. Single-walled carbon nanotubes (SWNTs or SWCNTs) have, for example, been at the forefront of nanoscience research for a variety of applications including gas sensing, composite materials, biosensing, and drug delivery. While the latter two applications have been successful, there are reports of cellular toxicity induced by SWNTs. Specifically, oxidative stress and the formation of free radicals, robust inflammatory response, and even asbestos-like pathogenicity have been found as a result of the introduction of SWNTs into biological systems.

As carbon nanomaterial production increases, the risk of environmental contamination is increasing. Such contamination can subsequently diffuse through aquifers and residential drinking water. As a result, precautions will have to be taken to ensure that the public, as well as the manufacturers, are safe from the toxic effects associated with these materials.

While oxidative "cutting" of carbon nanotubes and other carbon nanomaterials by aggressive and toxic oxidizing reagents is commonly used in laboratory practice, such oxidative reagents are not generally suitable for use in the environment outside the laboratory or in vivo. Carbon nanotubes can also be destroyed or degraded by incineration. However, incineration requires the ability to locate, collect, and/or concentrate carbon nanotube samples from the environment, which is often very difficult or even impossible.

SUMMARY

In one aspect, a method of degrading carbon nanomaterials includes mixing the carbon nanomaterials with a composition comprising a peroxide substrate and at least one catalyst selected from the group of an enzyme and an enzyme analog. The peroxide substrate undergoes a reaction in the presence of the catalyst to produce an agent interactive with the nanotubes to degrade the nanomaterials. The peroxide substrate can, for example, be hydrogen peroxide ($H_2O_2$ or HOOH) or an organic peroxide (ROOR', wherein R is generally any organic substituent or group and R' is generally any organic substituent or group or R' is H). In general, the agent is oxidative. The composition can, for example, be added to a system (for example, an environment or an organism/living tissue) including the carbon nanomaterials.

The catalyst can, for example, comprise a transition metal. In several embodiments, the transition metal is iron.

In a number of embodiments, the enzyme is a metal (that is, metal-containing) peroxidase or a laccase.

In a number of embodiments, the enzyme is horseradish peroxidase or a myeloperoxidase.

The nanomaterials can be functionalized or pristine (unfunctionalized). In a number of embodiment, the nanomaterials are carboxylated.

The catalyst can, for example, be an enzyme naturally occurring in plants or animals. In several embodiment, the enzyme naturally occurs in mammals. For example, the enzyme can naturally occur in humans.

An example of an enzyme naturally occurring in mammals is a myeloperoxidase. Myeloperoxidase can, for example, be present within a substance. The myeloperoxidase can, for example, be present within a neutrophil or a macrophage.

The carbon nanomaterials can, for example, be carbon nanotubes. In a number of embodiments, the carbon nanotubes are single walled carbon nanotubes.

In another aspect, a method of degrading nanomaterials includes mixing the carbon nanomaterials with a composition under conditions to degrade the nanotubes. The composition includes at least one catalyst and at least one substrate. The substrate undergoes a reaction in the presence of the catalyst to produce an agent interactive with the carbon nanomaterials. Conditions that can be established and/or controlled to degrade nanotubes include, for example, time of incubation/reaction, temperature, concentration of substrate, concentration of catalyst and pH.

The substrate can, for example, be a hydrogen peroxide or an organic peroxide. The agent is oxidative. In a number of embodiments, the substrate is hydrogen peroxide.

The catalyst can, for example, include a transition metal.

In several embodiments, the catalyst is an enzyme, an analog of an enzyme or a Fenton catalyst. In a number of embodiments, the catalyst includes iron. The catalyst can, for example, be $FeCl_3$.

In still other aspects, compositions and/or systems to degrade nanomaterials include compositions (catalyst/substrate combinations) as described above.

Compositions, methods and/or systems described herein are suitable to remove carbon nanotubes from an environment or organism. Compared to chemical oxidation with mixtures of concentrated acids, compositions, methods and/or systems described herein do not require toxic and corrosive chemicals. Compared to incineration, compositions, methods and/or systems described herein do not require isolation and/or concentration of carbon nanomaterials from environmental matrices (for example, waste water, soil, natural organic matter, etc.).

In several representative embodiments, degradation of carbon nanotubes and/or other carbon nanomaterials requires only the use of "green", non-toxic enzymes or enzyme analogs and relatively low concentrations of a peroxide substrates such as hydrogen peroxide (for example, <40 μM) or an organic peroxide. Moreover, the degradation process can be conducted under ambient/physiological conditions and over a wide range of, for example, temperature, catalyst concentration, substrate concentration, salinity, and pH, which can be readily optimized. Moreover, catalytic degradation such as enzymatic degradation is more robust than many potential biological (for example, microbial) treatments, which are highly sensitive to environmental conditions.

The compositions, systems and/or methods and related technology described herein, along with attributes and attendant advantages thereof, will be appreciated and understood in view of the following detailed description taken in conjunction with the accompanying drawings.

DETAILED DESCRIPTION

Figure 1A:
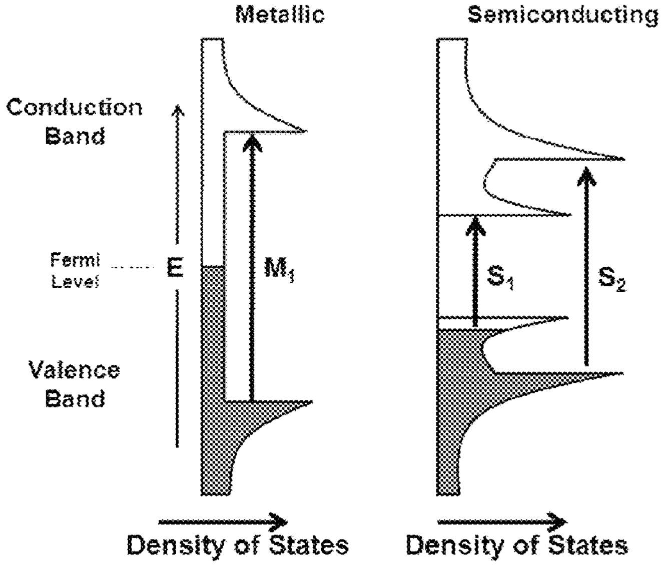
FIG. 1A illustrates energy/density of states band diagrams for both metallic and semiconducting carbon nanotubes (commercially available carbon nanotube samples are synthesized with varying helicities and diameters and include both types of carbon nanotubes).

As used herein and in the appended claims, the singular forms "a," "an", and "the" include plural references unless the content clearly dictates otherwise. Thus, for example, reference to "an enzyme" includes a plurality of such enzymes and equivalents thereof known to those skilled in the art, and so forth, and reference to "the enzyme" is a reference to one or more such enzymes and equivalents thereof known to those skilled in the art, and so forth.

As used herein, the term "enzyme" refers to a protein that catalyzes a chemical reaction. An enzyme catalyzes the conversion of a molecule or molecules (that is, a substrate or substrates) to a difference molecule or molecules. In general, proteins are polymeric organic compounds made of amino acids joined together by peptide bonds between the carboxyl and amino groups of adjacent amino acid residues. In general, the term "enzyme analog" as used herein refers to a compound including an active center or portion the same as or similar to that of the enzyme so that the catalytic activity (or similar catalytic activity) of the enzyme is retained by the enzyme analog. Examples of enzymes suitable for use in the present invention include, but are not limited to, enzymes including transition metals. Suitable enzymes include, for example, metal peroxidases such as horseradish peroxidase, myeloperoxidase, dehaloperoxidase, lignin peroxidase, lactoperoxidase, hemoglobin, myeloglobin and manganese peroxidase, as well as laccase. Enzyme analogs of, for example, certain peroxidases (such as horseradish peroxidase) include heme-containing molecules (for example, hemin, microperoxidase etc.).

As used herein, the term "carbon nanomaterials" refers to carbon materials with morphological features on the nanoscale. In general, the term "nanoscale" refers to material smaller than 100 nanometers in at least one dimension. In several representative embodiments, carbon nanomaterials undergo a catalyst-initiated (for example, an enzyme-initiated) degradation under a range of conditions. SWNTs were used in representative studies described herein as SWNTs have been at the forefront of research for a variety of applications. However, any type of carbon nanomaterials (including, but not limited to SWNTs, graphene, fullerenes, fullerols, nanodiamonds, nanocones, nanobarrels, nanofibers, nanoscrolls, nanowhiskers etc) can be degraded using the compositions, methods and/or systems hereof. Degradation was demonstrated, for example, with enzymes, with synthetic analogs of enzymes (such as porphyrin) and with Fenton catalysts. Representative studies were performed with $H_2O_2$ a representative substrate. As clear to one skilled in the art, other substrates (such as organic peroxide substrates) can be used in connection with various catalysts in accordance with known or readily determined catalyst/substrate pairings. It was further demonstrated that the resultant degraded carbon nanotubes do not elicit inflammatory response in the lungs of mice, which is sharp contrast to non-degraded nanotubes. The degradation reactions are thus effective to reduce toxicity.

Unlike the known oxidative cutting of carbon nanotubes by aggressive and toxic oxidizing reagents, catalyst initiated degradation utilizes components which are substantially non-toxic and do not require aggressive reagents.

The enzymatic degradation of carboxylated carbon nanotubes (SWNTs) using horseradish peroxidase (HRP) and low, localized concentrations of the substrate $H_2O_2$ (~40 μM) was, for example, demonstrated. In several studies, degradation of SWNTs with HRP was shown to proceed over the course of several weeks at 4° C. in the dark. HRP, as a heme peroxidase, contains a single protoporphyrin IX heme group. While in an inactive form, the heme peroxidase is of a ferric ($Fe^{3+}$) oxidation state. Hydrogen peroxide then binds to the ferric species, and a transient intermediate forms, in which peroxide is bound to the heme iron as a ligand. It is then thought to undergo a protein-assisted conversion to an oxywater complex specifically through the His 42 and Arg 38 residues leading to what is known as Compound I, comprised of a ferryl oxo iron ($Fe^{4+}$=O) and a porphyrin π cation radical. Without limitation to any mechanism, it is believed that the generation of Compound I (redox potential of 950 mV) through the heterolytic cleavage of $H_2O_2$ results in the degradation of carboxylated SWNTs located in close proximity to the HRP catalytic site.

A number of studies were carried out using electric arc discharge single-walled carbon nanotubes purchased from Carbon Solutions Inc. of Riverside, Calif. (P2-SWNTs or purified, low functionality SWNTs). The carbon nanotubes were further purified by oxidative treatment with $H_2SO_4$/

$H_2O_2$ to remove residual metal catalyst. This treatment is known to impart carboxylic acid groups to the carbon nanotubes, thereby improving solubility in aqueous media. After rigorous filtration with copious amounts of water, approximately 2 mg of nanotubes was suspended in 4.5 ml of phosphate buffered saline (PBS) at pH 7.0 using an ultrasonic bath for one minute (Branson 1510, Frequency 40 kHz). These suspended nanotubes typically remained well dispersed for one week at room temperature prior to precipitation, allowing for greater surface area exposure, and possibly greater degradation. Lyophilized horseradish peroxidase (HRP) Type VI (available from Sigma Aldrich) was solubilized in PBS at 0.385 mg/mL, and then added to the carboxylated nanotube suspension at a volume of 4.0 mL. The entire suspension was then statically incubated over 24 hours at 4° C. in the dark. These temperature conditions correspond with possible applications of biocatalytic systems for environmental biodegradation of carbon nanotubes in different seasons. An excess of 10.0 mL of 80 μM $H_2O_2$ was added to the bulk sample to start the catalytic biodegradation of carbon nanotubes in the presence HRP. The resulting concentrations of HRP and $H_2O_2$ were 0.1925 mg/mL and 40 μM, accordingly. Static incubation with $H_2O_2$ was also performed in refrigerated conditions and kept in the dark to avoid enzyme denaturation and photolysis of $H_2O_2$. Furthermore, assessments of HRP activity incubated with carbon nanotubes were performed. To avoid complications of spectrophotometric assays in the presence of strongly-light scattering suspensions, electron spin-resonance measurements of the activity were used based on detection of radicals formed during one electron oxidation of ascorbate, or a phenolic compound, etoposide. Both assays revealed strong signals from the respective peroxidase substrates, thus demonstrating that carbon nanotubes did not cause inactivation of the enzyme. Control of pH and temperature conditions was maintained to ensure the enzyme's prolonged survival over the incubation period.

Throughout the course of 16 weeks, aliquots (250 μL) of the incubating suspension were removed biweekly after gentle shaking of the bulk sample to evenly distribute material without denaturation of HRP. An equal volume of 80 μM H2O2 was then added to replace the volume of aliquot removed. Visual evidence of biodegradation of the suspended carbon nanotubes over the full range of incubation time was provided by a steady progression of fading color intensity and turbidity from the control sample through week 16, at which time the solution of incubated nanotubes appears to be clear. The decline of light scattering and absorbance from nanotubes cannot be the result of simple dilution, as even though 250 μL aliquots were replaced with an equal volume of $H_2O_2$, this is not a significant volume for a mass dilution of the 20 mL bulk sample. A simple explanation involves oxidation of already carboxylated nanotubes through a highly reactive intermediate—Compound I—produced via the interaction of $H_2O_2$ and HRP.

To add to the visual confirmation of biodegradation of HRP-incubated nanotubes, Transmission Electron Microscopy (TEM) was used to examine each aliquot removed from the incubating bulk sample. Initially atomic force microscopy (AFM) was used to characterize these aliquots, but visualization at later weeks became impossible because biodegraded material obscured the images. To effectively terminate the oxidative reaction of HRP/$H_2O_2$ and to remove effectively PBS salts, which were found to obstruct the imaging, centrifugation (3400 rpm) was used to decant off the PBS solution, followed by re-suspension into approximately 1 mL of N,N-Dimethylformamide (DMF) through sonication. As DMF has typically shown excellent dispersion of carbon nanotubes, while denaturing HRP, DMF acted as an effective solvent for imaging without the development of any noticeable residue. One drop of the aliquot in DMF was then placed on a lacey carbon grid (Pacific-Grid Tech) and allowed to dry in ambient for 2 hours prior to TEM imaging (FEI Morgagni, 80 keV). The carboxylated carbon nanotubes were approximately 517±372 nm in length, based on point-to-point measurements. As incubation time progressed to 8 weeks, a substantial decrease in average nanotube length (231±94 nm) was observed a globular material appeared. By the end of concurrent incubation period (16 weeks), it had become difficult to identify any nanotube structure. Examination of the samples at 12 weeks revealed that the bulk of nanotubes were no longer present, and globular material had amassed, contributing to the predominant species imaged.

In agreement with these data, dynamic light scattering (Particle Technology Labs, Malvern Zetasizer Nano) showed a sharp contrast in size distributions through progressive weeks. Particle sizes were determined based off the refractive index of carbon as the particle and DMF as the carrier fluid. Smaller size distributions at progressive weeks may be attributed to decreased bundling in nanotube structures, however other data point to degradation of material. To further examine the ability of HRP/$H_2O_2$ to biodegrade nanotubes, their mobility profile was studied using electrophoresis in a 0.5% agarose gel. To reveal the location of nanotubes in the gel, a complex of albumin with bromophenol blue stain was used. In the absence of nanotubes, albumin/bromophenol blue complex gave a distinctive band. Control (non treated) nanotubes, as a result of their relatively large size, did not enter the gel and caused retardation in the migration of the albumin/bromophenol blue complex. When the suspension incubated for 16 weeks with HRP/$H_2O_2$ was loaded on the gel, no distinctive band of nanotubes was detectable at the loading site and the albumin/bromophenol blue complex migrated as a free complex similar to the control.

Additionally, thermogravimetric analysis (TGA) was performed on a larger sample with more frequent $H_2O_2$ additions. Approximately 5 mg of carboxylated nanotubes were incubated with HRP at 37° C. with hourly additions of 1 mM $H_2O_2$ for 5 days. Examining the mass of this sample after solvent removal, it was found that approximately 40% by weight of nanotube material was lost. TGA showed a marked contrast in profiles. Carboxylated carbon nanotubes started to lose weight around 200° C., whereas pristine SWNTs began to lose weight around 900° C. However, nanotubes incubated with HRP/$H_2O_2$ were less stable and demonstrated larger overall weight loss with the most significant losses at 100° C. and 670° C. These result indicate a higher level of induced defects in agreement with TEM observations.

To further characterize species present in the incubation aliquots, matrix assisted laser desorption/ionization time of flight (MALDI-TOF) mass spectrometry was used to analyze varying samples. An Applied Biosystems Voyager 6174 was used in a positive ionization mode whereby all samples were analyzed using α-cyano-4-hydroxycinnamic acid as a calibration matrix. All samples (carbon nanotubes, carbon nanotubes with HRP only, and carbon nanotubes incubated in HRP/$H_2O_2$ for t=16 weeks) were suspended in DMF and prepared as described previously. The carbon nanotubes and the control sample of nanotubes with HRP only (that is, without $H_2O_2$), shared similar mass to charge (m/z) peaks, specifically at approximately 12,000. This evidence supports that HRP alone (43,000 m/z) is not responsible for any decrease in m/z of carboxylated nanotubes. In contrast, carbon nanotubes incubated for 16 weeks with HRP/$H_2O_2$ had sharply differing characteristics. In the case of the carbon nanotubes incubated for 16 weeks with HRP/$H_2O_2$, only the lower end of the spectrum produced any relevant signal, with no peaks present at m/z of 12,000. Focusing on the m/z ratio from 500-2500, multiple peaks were found in high intensity (>50%), specifically between 600-1000. The presence of these lower m/z peaks and the lack of signal at 12,000 may be indicative of oxidative fragmentation and possibly a shortening of nanotube material throughout the incubation period.

Figure 1B:
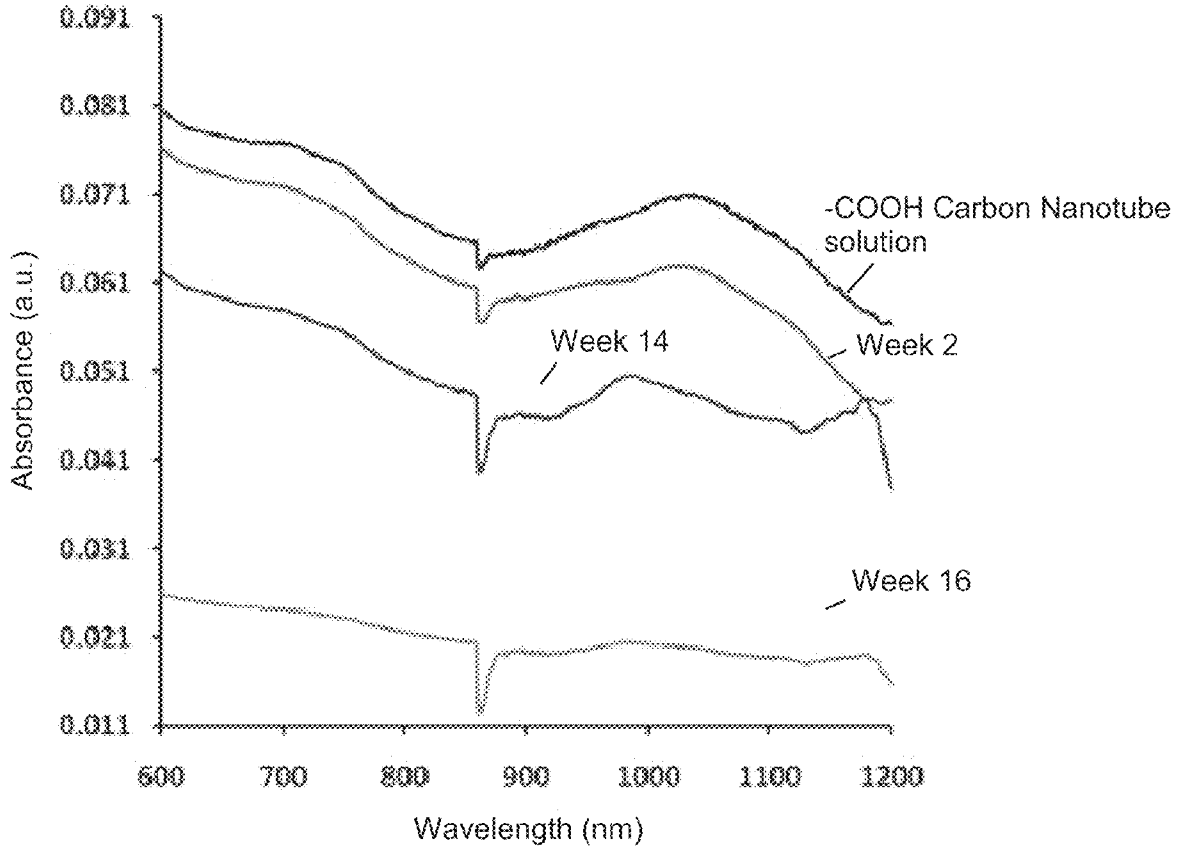
FIG. 1B illustrates UV-Vis-NIR spectroscopic measurements tracing biodegradation of carbon nanotubes as horseradish peroxidase (HRP)/$H_2O_2$ incubation time increases at 4° C., showing blue shifting in the $S_2$ semiconducting band as incubation time increases and a loss in band structure at 16 weeks as the carbon nanotubes degrade.

HRP/$H_2O_2$ mediated oxidative modification of carbon nanotubes was further investigated using UV-Vis-NIR spectroscopy (Perkin Elmer). Aliquots (500 μL) were sonicated briefly in DMF before being analyzed. As carbon nanotubes are mixtures of different diameters and helicities; the spectrum includes electronic transitions for both metallic and semiconducting nanotubes. FIG. 1A illustrates metallic and semiconducting density of states band diagrams for carbon nanotubes synthesized with varying helicities and diameters. FIG. 1B shows UV-Vis-NIR spectra from 600-1200 nm for increasing incubation times. This wavelength range was chosen to avoid spectral interference from solvent and water molecules. The broad S2 semiconducting band of the carbon nanotubes is evident between 1000 and 1100 nm, as well as the M1 metallic band between 650-750 nm. By monitoring the S2 band over the incubation period, two distinct features are observed: 1) The S2 band blue shifted as time progressed and 2) by week 16, most band structure in terms of the S2 and M1 bands was lost. Both the blue shifting of the S2 band and loss of structure by week 16 can be attributed to the degradation of carbon nanotubes. Because blue shifting is not significant upon enzyme addition, it can be postulated that only smaller diameter nanotubes are present in later weeks of incubation. Since nanotubes have an energy-induced band gap inversely proportional to nanotube diameter, it is possible that only smaller diameter material is present; while at week 16, loss of band structure is indicative of most nanotube material being oxidized.

In a number of other studies, carboxylated and pristine (that is, non-carboxylated/substituted) SWNTs were incubated with HRP at varying concentrations of $H_2O_2$ and at a temperature greater than 4° C. Evaluation of those conditions shows significant acceleration of reaction kinetics at room temperature with little influence by an excess of $H_2O_2$ in the tested regime. However, no significant degradation was observed of pristine SWNT over the time frame (and under the other conditions) of the testing. Without limitation to any mechanism, it is possible hydrophobic interactions prevented proximity of the HRP heme site to the nanotubes in the case of pristine SWNTs. Molecular modeling was used to further investigate possible binding sites for carboxylated and pristine SWNTs to HRP, resulting in varying proximity to this active site.

Degradation of pristine carbon SWNTs/nanomaterials with HRP (and/or other enzymes or enzyme analogs) and $H_2O_2$ may proceed under different conditions (for example, over longer time frames) than those tested. Furthermore, solubilization of the materials may, for example, be used to overcome hydrophobic and/or other interactions and effect degradation of pristine carbon SWNTs/nanomaterials with HRP (and/or other enzymes or enzyme analogs) and $H_2O_2$.

Functional groups other than carboxyl groups which are, for example, hydrophilic (for example, phenol groups, aldehyde groups, ketone groups etc.) or charged functionalities can be used to facilitate degradation of carbon nanomaterials with certain enzymes (for example, HRP) or enzyme analogs. Polymer coatings and/or surfactants can have similar effect on carbon nanomaterial enzymatic degradation.

Functionalization and/or control of incubation conditions (for example, time of incubation etc.) can also be used to effect selective degradation of certain carbon nanomaterials over other carbon nanomaterials or a desire degree of degradation.

It is known that rates of chemical reactions are generally increased by a factor of 2 to 4 for every 10° C. increase in temperature. According to this general observation, for a temperature increase from 4° C. to 25° C., an increase in the kinetic rate by a factor of 4-8 can be expected. Such an increase in temperature would result in the same degradation in approximately 2 weeks at 25° C. as would be observed in 8 to 16 weeks at 4° C. (provided that enzyme denaturation does not occur at the higher temperature).

In several studies, HRP and carboxylated SWNTs were statically incubated for 24 hours at room temperature prior to the addition of 8.0 mL of 80 μM $H_2O_2$ to begin the reaction. $H_2O_2$ was subsequently added to the reaction on a daily basis at 250 μL volume for ten days, and the sample vials were kept in the dark to avoid photolysis of $H_2O_2$. Comparison of the appearance of an initial vial of carboxylated nanotubes to a vial after day 10 of incubation with HRP and daily additions of 80 μM $H_2O_2$ revealed a noticeable decrease in light scattering and absorbance at day 10 of incubation.

To confirm that the decrease in light scattering was the result of degradation, transmission electron microscopy (TEM) was performed on samples prior to and after ten days of incubation with HRP and $H_2O_2$. Non-degraded, carboxylated SWNTs and carboxylated SWNTs degraded by HRP and $H_2O_2$ at room temperature were tracked over the course of ten days. Carboxylated SWNTs displayed lengths of approximately 400 nm prior to incubation. After three days, some carbonaceous material was present resembling that of SWNTs. A high-resolution TEM image of SWNTs after three days of degradation demonstrated that, while a one-dimensional structure was still evident, no crystal lattice structure was present, indicating the oxidation of graphitic material. After ten days, no noticeable carbon nanotube material was apparent, presumably as a result of the oxidation of the graphitic carbon lattice to $CO_2$ gas. While most fields on a lacey carbon TEM grid appeared to be unoccupied, ~2% (1 field in 50) had carbonaceous products, not resembling SWNTs. Such carbonaceous products may be intermediates of incomplete oxidation.

Figure 2A:
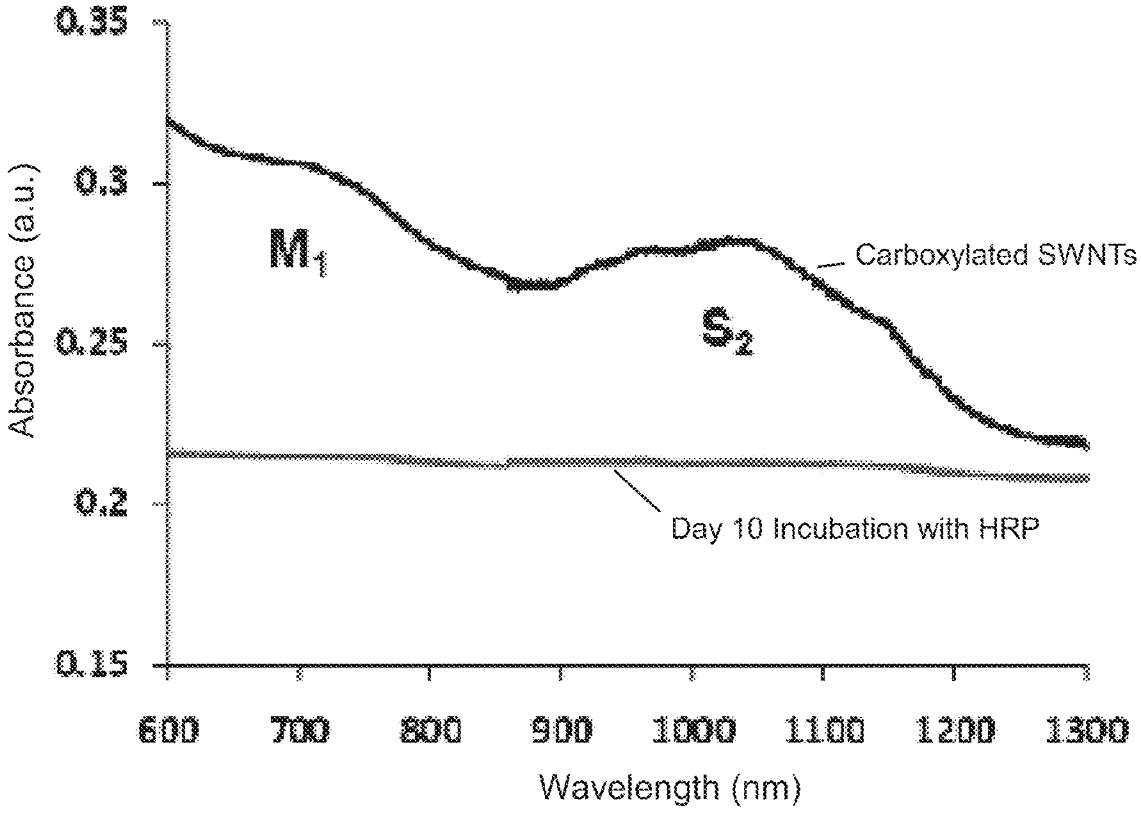
FIG. 2A illustrates Vis-NIR spectra of carboxylated SWNTs, before and after 10 days of incubation with HRP and $H_2O_2$ at 25° C.
Figure 2B:
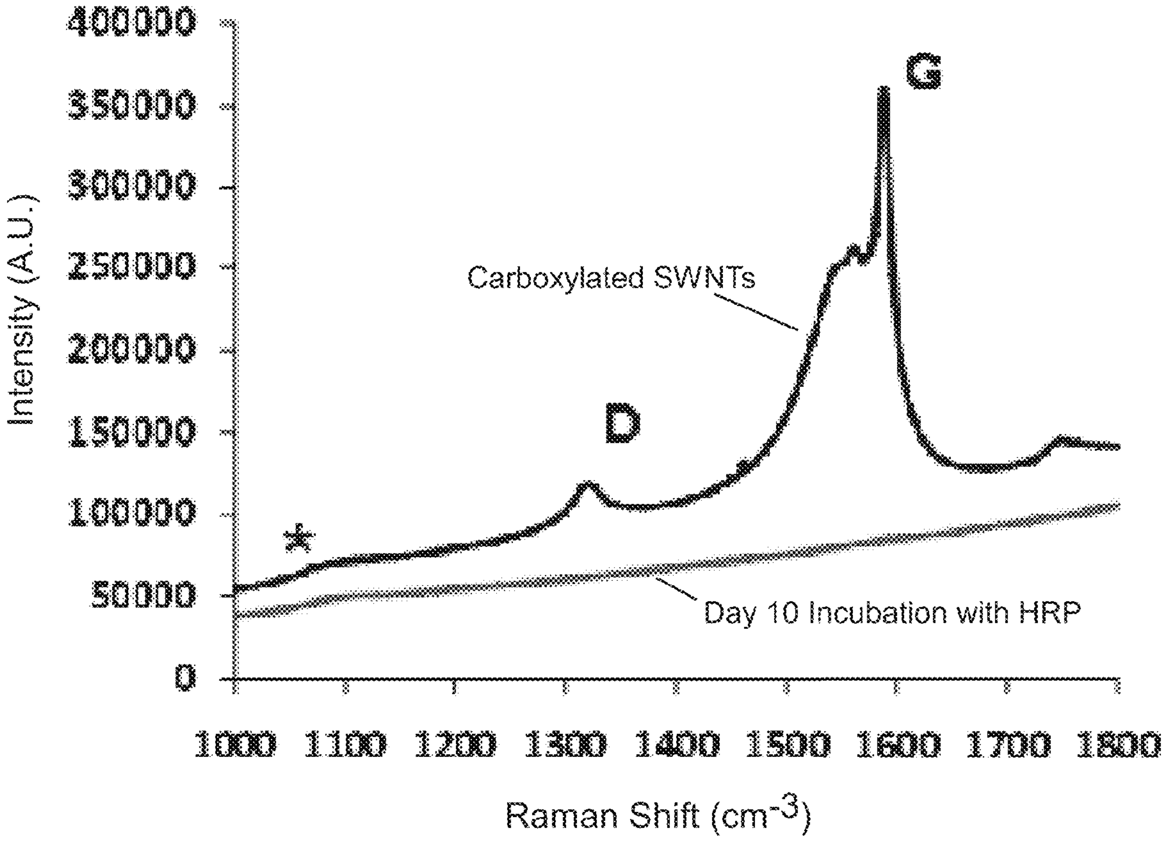
FIG. 2B illustrates Raman spectra of carboxylated SWNTs before and after 10 days of incubation with HRP and $H_2O_2$ at 25° C.

Degradation was additionally confirmed spectroscopically. Visible-near infrared (Vis-NIR) absorption spectroscopy measurements were taken on carboxylated SWNTs (aq) and those degraded after ten days of incubation with HRP and 80 μM $H_2O_2$ (aq). As discussed above, SWNTs are synthesized as mixtures of varying diameters and chiralities, exhibiting metallic and semiconducting electronic properties, as well as corresponding spectral features. FIG. 2A shows the spectral features of carboxylated SWNTs, evident from the broad $S_2$ second semiconducting transition absorbing between 1000-1100 nm, and the $M_1$ metallic transition absorbing between 650-750 nm. These bands appear to be subdued upon incubation with HRP and $H_2O_2$. As graphitic structure becomes oxidized, transitions associated with $sp^2$ hybridized carbon in SWNTs would diminish and completely disappear as a result of enzymatic degradation. Further examination with Raman spectroscopy reveals similar results. FIG. 2B displays the tangential G-band and disorder-induced D-band of carboxylated SWNTs. After enzymatic-degradation for ten days, these bands are no longer present, and only the signal for the quartz substrate (denoted by *) is present. These data again confirm the degradation of carboxylated SWNTs over the span of 10 days when incubating at room temperature (25° C.).

To examine further the mechanism of degradation between HRP and SWNTs, studies were performed investigating the role of carboxylated versus pristine graphitic lattices. Pristine SWNTs (Carbon Solutions, Inc.) were incubated under the same conditions as described for carboxylated SWNTs. Briefly, pristine SWNTs were sonicated for approximately five minutes in DMF. Samples were then centrifuged at 3400 rpm and the supernatant was decanted. The precipitated pristine SWNTs were then washed with double-distilled $H_2O$ and re-suspended in 4.0 mL of PBS through additional sonication. Pristine SWNTs treated in this manner retained some solubility (suspension stable for up to 2 days), but not to the extent of carboxylated SWNTs. Periodic shaking was then necessary to re-suspend pristine SWNTs. To this suspension, 4.0 mL of 0.385 mg/mL HRP (aq) was added and allowed to incubate for 24 hours prior to $H_2O_2$ additions as previously performed. Over the course of the 10-day incubation with HRP and $H_2O_2$, there was no noticeable decrease in scattering or absorbance but increased aggregation, suggesting a lack of degradation of carbon material. To confirm this phenomenon, TEM imaging was performed on an aliquot taken 10 days after incubation with HRP and 80 μM $H_2O_2$, which demonstrated that pristine SWNTs are still intact (1-2 μm in length) and did not appear to be deformed or degraded in any manner. The role of $H_2O_2$ concentration and the viability of HRP with pristine SWNTs were further studied.

In that regard, pristine SWNTs were subjected to conditions as described above with the exception of a higher initiating degradation (that is, an excess of 800 μM $H_2O_2$ ($K_M$: 0.11 mM)). TEM micrographs demonstrated no significant degradation with the addition of 800 μM $H_2O_2$. Closer examination using high-resolution TEM revealed bundled SWNTs that retained their crystal structure after ten days of incubation with HRP and 800 μM $H_2O_2$. Such data, however, may point to the denaturing or inactivation of HRP by pristine SWNTs. It was therefore further investigates whether the enzyme retains activity in solution with pristine SWNTs, and if this activity is affected by the 10-fold increase in $H_2O_2$ concentration.

To test the viability of HRP in the presence of pristine SWNTs, Amplex Red was used. Amplex Red (10-acetyl-3,7-dihydroxyphenoxazine) is a reagent commonly employed to measure trace $H_2O_2$ concentrations in biological systems. In the presence of $H_2O_2$, Amplex Red undergoes HRP-catalyzed oxidation to form radical intermediates. The radical intermediates then proceed via a dismutation reaction to form resorufin, which has distinct fluorescence and absorbance spectra. Since the conversion of Amplex Red to resorufin depends on an active enzyme, the spectral features of resorufin can be used to monitor HRP activity. Thus by monitoring an absorbance peak present at 570 nm, a result of resorufin produced from active enzyme and Amplex Red, it is possible to validate enzyme viability. UV-Vis spectroscopic data displayed a peak around 570 nm, which indicated that HRP was originally active. There was no decrease in absorbance at day ten. Thus, a sufficient quantity of HRP remained active to catalyze the conversion of Amplex Red into resorufin. While it may be possible that HRP is deactivated by auto-oxidation, a significant contribution from active HRP is still present. Moreover, HRP remained viable after additions of both 80 μM and 800 μM $H_2O_2$. It was thus determined that, while HRP remains active (or partially active) in the presence of pristine SWNTs, it did not catalyze the degradation of pristine SWNTs in the tested time frame and given HRP concentration. Further spectroscopic confirmation of this phenomenon was observed using Vis-NIR spectroscopy. Characteristic $S_2$ and $M_1$ bands were present after ten days of incubation, demonstrating a lack of degradation.

Without limitation to any mechanism, the studies described above indicate heterolytic cleavage of $H_2O_2$ to form Compound I and $H_2O$. A proximity effect between the active site of Compound I and SWNTs may lead to the observation that pristine SWNTs do not degrade in the presence of HRP and $H_2O_2$ over the time frame (and under the other conditions) of the studies. Once again, however, degradation of pristine carbon SWNTs/nanomaterials with HRP (and/or other enzymes or enzyme analogs) and $H_2O_2$ may proceed under other conditions (for example, over longer time frames) than those studied. As also described above, solubilization of the materials may, for example, be used to overcome hydrophobic and/or other interactions and effect degradation of pristine carbon SWNTs/nanomaterials with HRP (and/or other enzymes or enzyme analogs) and $H_2O_2$.

In contrast to heterolytic cleavage of $H_2O_2$, homolytic cleavage of $H_2O_2$ results in the production of hydroxyl radicals (.OH) via, for example, Fenton's chemistry. In several studies, incubation with other catalytic, ferric iron species, including hemin and $FeCl_3$, with $H_2O_2$, resulted in the degradation of both carboxylated and pristine SWNTs. This result is consistent with a homolytic cleavage of $H_2O_2$ and the formation of free radicals. Further characterization with GC-MS and HPLC of carboxylated SWNT samples (incubated with either HRP or ferric iron species) demonstrated that $CO_2$ as well as other products result from the degradation. Product analysis revealed the formation of $CO_2$ and intermediate oxidized aromatic hydrocarbons.

As described above, the Fenton catalyst, $FeCl_3$ catalyzes homolytic radical generation from $H_2O_2$. In that regard, $H_2O_2$ oxidizes $Fe^{2+}$ to $Fe^{3+}$ and produces $OH^-$ and .OH. Ferric iron is then reduced back to ferrous iron by additional peroxide, producing $H^+$ and .OOH.

$$Fe^{2+}+H_2O_2\rightarrow Fe^{3+}+.OH+OH^- \quad (1)$$

$$Fe^{3+}+H_2O_2\rightarrow Fe^{2+}+.OOH+H^+ \quad (2)$$

While both Compound I and hydroxyl/hydroperoxyl radicals are highly oxidizing species, the ability of Compound I to degrade SWNTs may be contingent upon spacial proximity to the heme active site, whereas hydroxyl/hydroperoxyl radicals are limited only by diffusion or their half-life.

As described above, to compare the HRP oxidation mechanisms involving Compound I formation and hydroxyl and hydroperoxyl radicals formed via Fenton chemistry to degrade SWNTs, hemin (chloride), a ferric iron chloroprotoporphyrin, and a ferric iron salt ($FeCl_3$) were studied. While Fenton catalysis is typically initiated with ferrous iron, ferric iron species were chosen to be consistent among all iron forms tested. Further, because $FeCl_3$ lacks the protein structure of HRP, homolytic cleavage of $H_2O_2$ to form hydroperoxyl and hydroxyl radicals are the predominant pathway for oxidation to occur, whereas hemin may act under either a homo- or heterolytic cleavage mechanism.

For the examination of hemin, approximately 1 mg of pristine or carboxylated SWNTs was sonicated in 4.0 mL of DMF. Hemin ($1\times10^{-4}$ M, in DMF) was then added in excess at a volume of 16.0 mL. After 24 hours of incubation, samples were centrifuged, decanted of excess hemin and DMF, and sonicated into 4.0 mL of double distilled water. Typically, hemin forms an inactive dimer when free in solution. However, it has been previously shown that porphyrins physisorb onto SWNTs, providing close proximal contact to the iron site. Such proximity may result in increased activity, generating oxidizing species close to carboxylated and pristine SWNTs, promoting degradation. The degradation reaction was initiated by the addition of 4.0 mL of 800 μM $H_2O_2$, followed by daily additions of 250 μL of 800 μM $H_2O_2$ for a total of ten days.

Figure 3A:
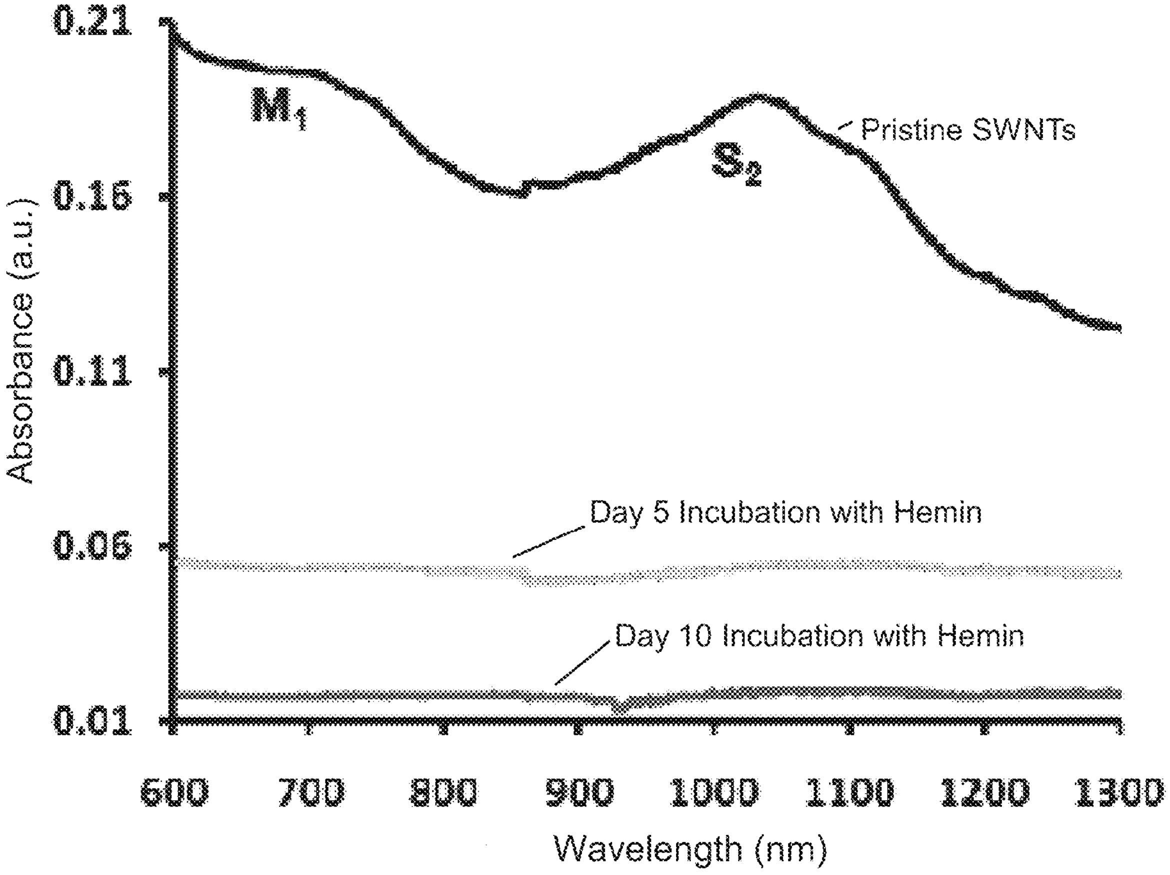
FIG. 3A illustrates Vis-NIR spectra of pristine (unfunctionalized) SWNTs before degradation and after incubation/degradation with hemin and $H_2O_2$ over ten days.
Figure 3B:
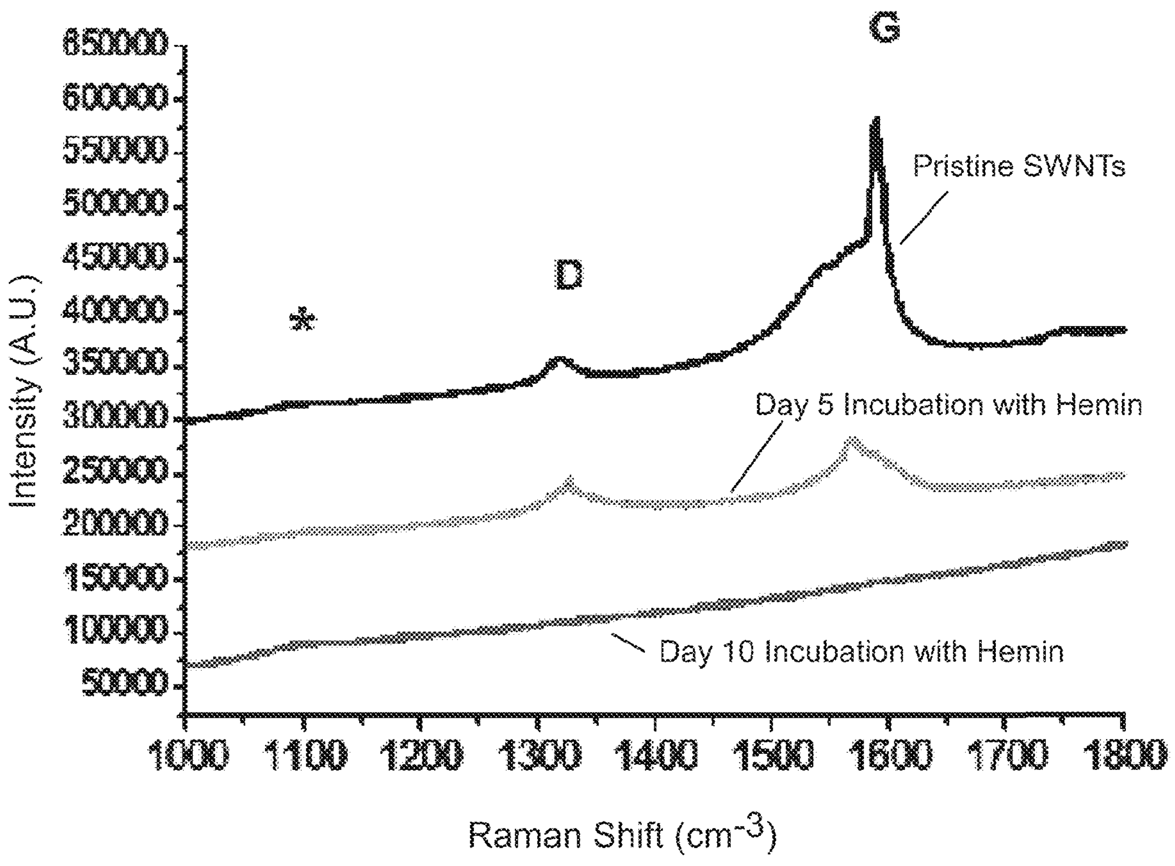
FIG. 3B illustrates Raman spectra of carboxylated SWNTs before and after 10 days of incubation with hemin.

Over the ten-day incubation period, carboxylated SWNTs were degraded by hemin and 800 μM $H_2O_2$. Pristine SWNTs also showed significant degradation. TEM studies of the degradation reaction were preformed over the course of ten days. After two days of incubation, pristine SWNTs appeared to "swell" and aggregated together. After four days, however, pristine SWNTs broke down with significant noticeable deformation. By day 8, only small carbonaceous products and residual iron (catalyst from nanotube synthesis) were present Spectroscopic data further support these observations. FIG. 3A shows the Vis-NIR spectra of pristine SWNTs degraded with hemin and $H_2O_2$ over ten days. A loss of intensity and changes in band shape for the $M_1$ and $S_2$ metallic and semiconducting transitions of pristine SWNTs are quite evident and comparable to results seen with carboxylated SWNT degraded by HRP and $H_2O_2$. These spectral changes suggest degradation of the pristine graphitic material. Raman characterization further supports this degradation as demonstrated in FIG. 3B. Pristine SWNTs display prominent D and G band contributions initially. After five days of degradation, the D:G band ratio increases, indicating modification of the pristine SWNT structure, accompanied by an increase in the number of defect sites. By day 10 of incubation, only the residual peak for the quartz substrate is present as indicated by an asterisk. The degradation of pristine SWNTs by hemin may proceed by increased proximity to the active iron site, whereas HRP may limit such proximity as a result of distal site binding.

To compare these degradation methods to that of a Fenton catalyst, wherein only free radicals are generated, $FeCl_3$ was used. 1 mg of carboxylated or pristine SWNTs was sonicated for 1 minute into 4.0 mL of double distilled water. Then, 500 μL of $FeCl_3$ ($1\times10^{-4}$ M, aqueous) was added to all samples. The samples were incubated for 24 hours before 4.0 mL of 800 μM $H_2O_2$ was added to initiate the reaction. Daily additions of 250 μL of 800 μM $H_2O_2$ were continued for ten days. TEM images revealed that even after two days of incubation, long pristine SWNTs oxidized into individual flakes. By day 4, the flakes were approximately 40 nm in length. By day 8, it appeared that mostly residual iron was present. Upon closer examination with high-resolution TEM, flakes (~3 nm wide) displayed a crystal lattice structure, indicating the presence of graphitic material.

Figure 4A:
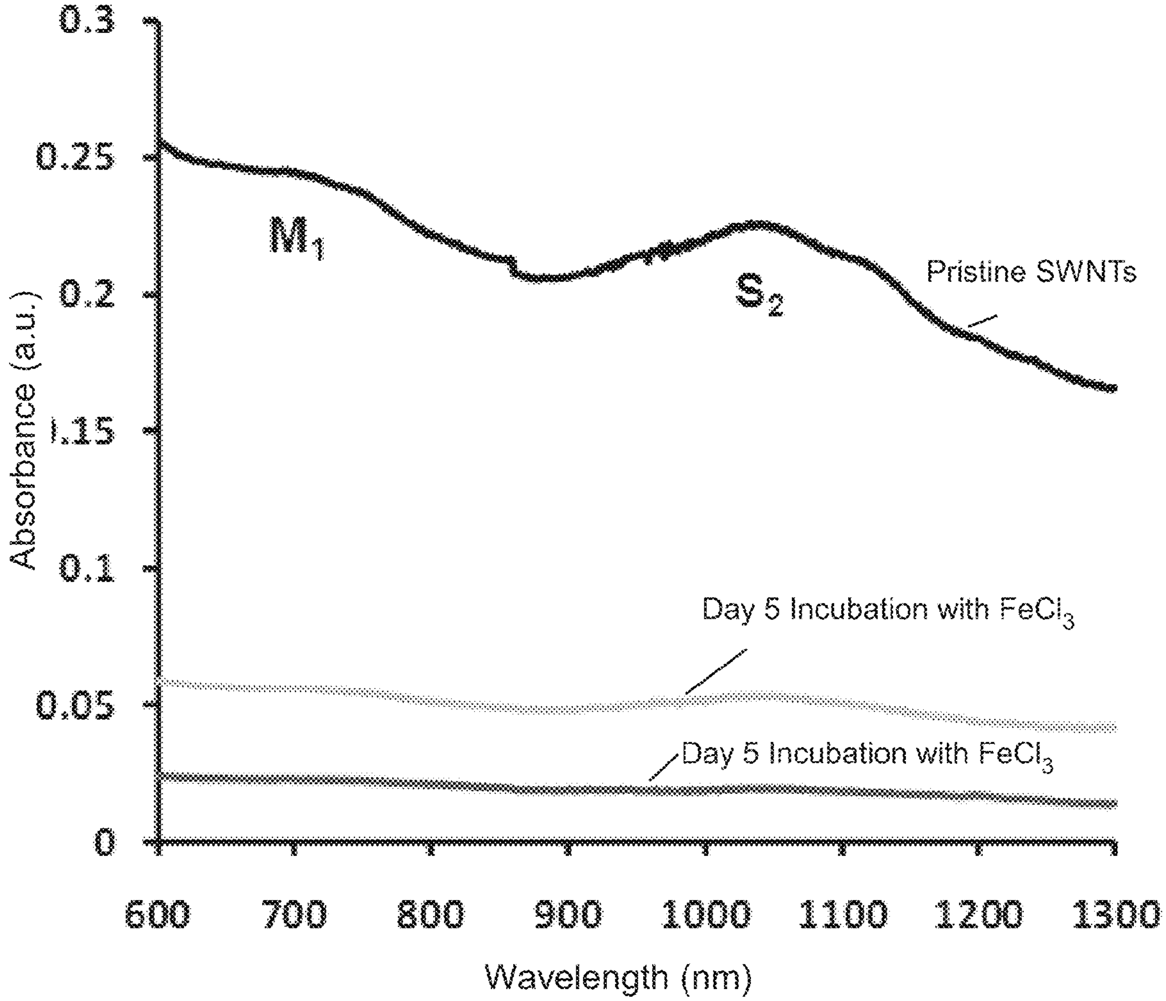
FIG. 4A illustrates Vis-NIR spectra of pristine SWNTs before degradation and after incubation/degradation with $FeCl_3$ and $H_2O_2$ over ten days.
Figure 4B:
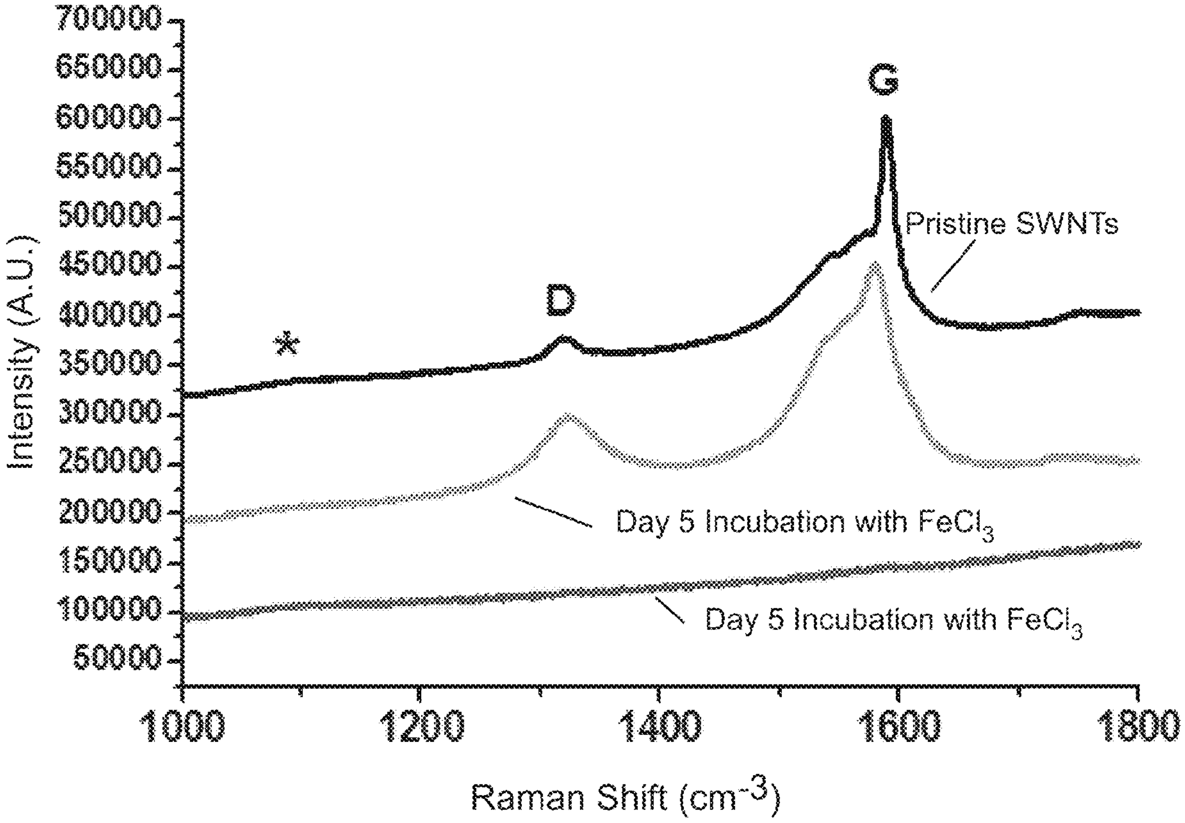
FIG. 4B illustrates Raman spectra of carboxylated SWNTs before and after 10 days of incubation with $FeCl_3$.

The observations of degradation were confirmed spectroscopically. FIG. 4A shows the Vis-NIR spectra of pristine SWNT degradation. Initially, pristine SWNTs displayed pronounced semiconducting and metallic transition bands ($S_2$ and $M_1$, respectively). Following five days of incubation, these bands were greatly suppressed, and finally all band structure was lost at day 10. Raman data conformed to these results as shown in FIG. 4B. Pristine SWNTs were observed to have defined D and G band peaks contributed by the defect sites and the pristine graphitic lattice of the SWNTs, respectively. The ratio of the D to G bands then increased after 5 days, indicating progressive oxidation of the material. By day 10, however, only the peak for the quartz substrate was observed, indicating a complete loss of nanomaterial.

Results with both hemin and $FeCl_3$ indicate that increasing the proximity of active iron sites and generating radical oxygen species, pristine SWNTs will degrade. Conversely, no degradation is evident with pristine SWNTs and HRP under the conditions of the studies, indicating an alternate degradation mechanism, presumably because of the heterolytic cleavage of $H_2O_2$ to form Compound I. The role of SWNTs in the homolytic degradation reaction is significant as Fenton catalysis is typically generated from ferrous iron. $FeCl_3$ is in a ferric valency state prior to addition with pristine SWNTs. Because the degradation reaction does progress, it may be that carbon nanotubes are acting as a reducing agent to reduce ferric iron to ferrous iron because of their unique redox properties associated with inherent polyphenol functionalities located within the SWNT lattice of both pristine and carboxylated varieties.

Figure 5A:
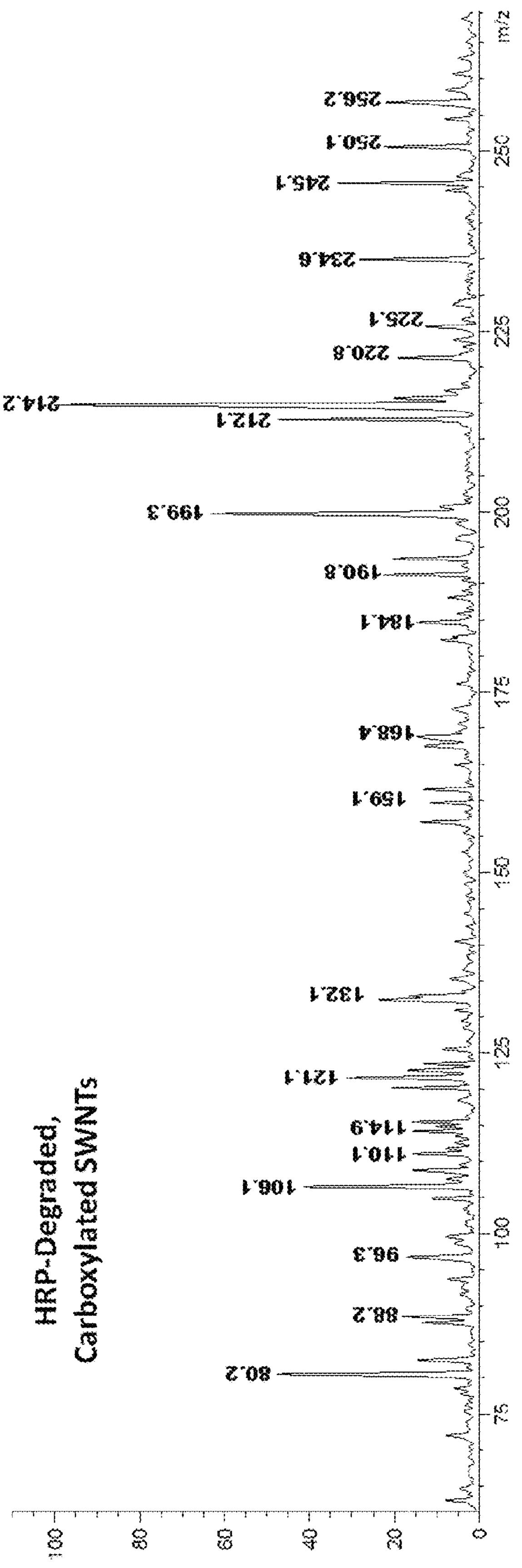
FIG. 5A illustrates liquid chromatography-mass spectroscopy (LC-MS) analysis of degradation products resulting from HRP/$H_2O_2$-degraded, carboxylated SWNTs.
Figure 5B:
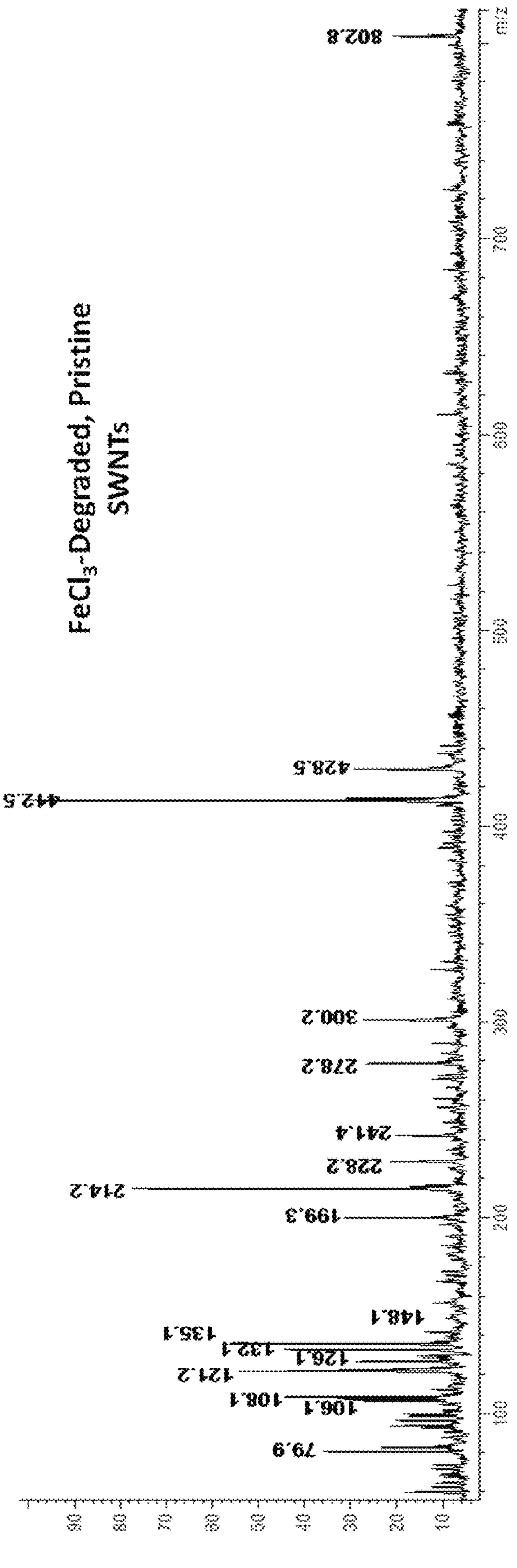
FIG. 5B illustrates a liquid chromatography-mass spectroscopy (LC-MS) analysis of degradation products resulting from $FeCl_3$/$H_2O_2$-degraded, pristine SWNTs.
Figure 5C:
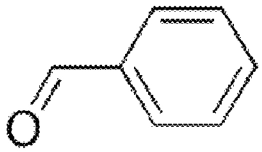
FIG. 5C illustrates the structures of intermediate degradation products identified and present after HRP degradation.
Figure 5C:
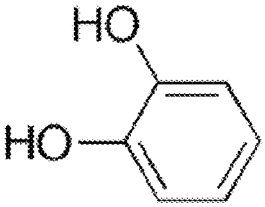
Figure 5C:
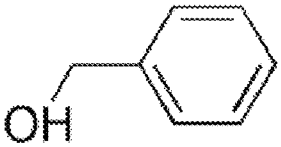
Figure 5C:
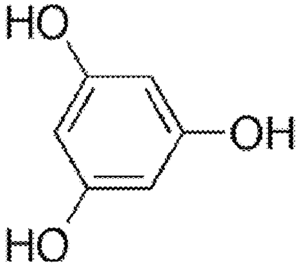
Figure 5C:
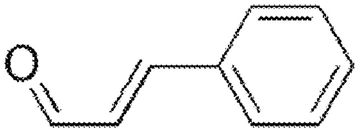
Figure 5C:
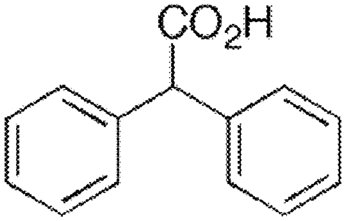
Figure 5C:
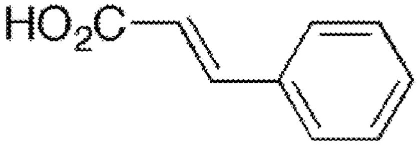
Figure 5C:
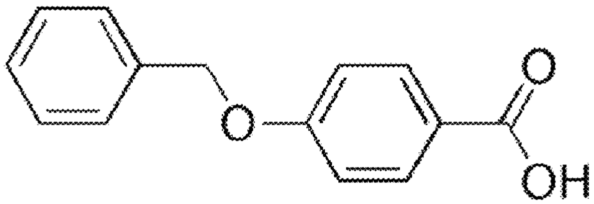

Identification of intermediate products of the HRP-catalyzed degradation reaction was performed using HPLC, LC-MS, and GC-MS. Results with HPLC indicated that similar products were obtained for both heterolytic and homolytic degradation mechanisms. In LC-MS studies of products resulting from the degradation of SWNTs by HRP, hemin, or $FeCl_3$, samples were prepared by removing 3 mL aliquots from bulk aqueous solutions, acidifying with 0.1M HCl, and extracting with dichloromethane (3 mL). After solvent removal, the products were re-dispersed into 500 μL of MeOH and separated/analyzed using a reversed-phase C18 column and mass. By analyzing positive ions, multiple products were identified from HRP-degraded, carboxylated SWNTs. As shown in FIG. 5A, mass to charge (m/z) values of 106.1, 110.1, 132.1, and 212.1 were observed for HRP-degraded SWNTs, indicative of benzaldehyde (1), 1,2-benzenediol (2), cinnamaldehyde (3), and diphenylacetic acid (4). Of significance, $FeCl_3$-degraded pristine SWNTs exhibited similar degradation products (FIG. 5B). In addition to those molecules attributed to HRP degradation, benzyl alcohol (5), 1,3,5-benzenetriol (6), cinnamic acid (7), and 4-benzyloxybenzoic acid (8) were also identified. The results confirm the presence of similar classes of compounds for both heterolytic and homolytic degradation mechanisms.

As a result of complete oxidative degradation of SWNTs, however, one would expect the final product to be carbon dioxide, a gas. To verify the production of $CO_2$ as a product of complete degradation, GC-MS was used to analyze the headspace of the sample. Sample vials were prepared by capping with a septum and parafilm, thus allowing for the sampling of headspace using a gas-tight needle. Approximately 2 μL of sample headspace was injected at two discrete times: (i) prior to the introduction of $H_2O_2$ to initiate the reaction and (ii) after ten days of incubation with HRP and $H_2O_2$. $CO_2$ concentrations were evaluated relative to ambient $N_2$ concentrations present in the headspace. Further, a control of double distilled water and $H_2O_2$ (no HRP) was treated and analyzed under the same conditions to verify contributions from any possible ambient $CO_2$. An increase in $CO_2$ (m/z: 44) contributions after ten days of incubation was observed. The abundance of $CO_2$ doubled over the course of ten days. Further examination of $CO_2$ production with hemin and $FeCl_3$ mediated degradation was also performed. $CO_2$ concentration became approximately 100% higher with carboxylated SWNTs degraded in the presence HRP, hemin, or $FeCl_3$. Conversely, pristine SWNTs incubated with HRP had a minimal evolution of $CO_2$, comparable to the control of $H_2O$. Pristine SWNTs incubated with hemin or $FeCl_3$, however, displayed a marked increase in $CO_2$.

The evolution of $CO_2$ gas in sample headspace was also monitored on a daily basis to compare the kinetics of the degradation process between carboxylated and pristine SWNTs incubated with HRP and $H_2O_2$ (800 μM). $CO_2$ evolution was followed for 10 days and measured relative to $N_2$. Pristine SWNTs incubated with HRP and $H_2O_2$ did not produce significant concentrations of $CO_2$ in the sample headspace over the course of ten days, further indicating a lack of significant degradation of the pristine material incubated with HRP and $H_2O_2$ under the conditions of the studies. Conversely, when carboxylated SWNTs were incubated with HRP and $H_2O_2$, $CO_2$ was measured in the sample headspace and found to follow pseudo-first order kinetics.

Atomic force microscopy (AFM) was used to probe the interaction between HRP and carboxylated SWNTs. Upon examining carboxylated SWNTs incubated with HRP, it was evident that enzyme attachment presumably occurred at the carboxylated sites along the axis of SWNTs. Section analysis confirmed this additive effect of enzyme attachment. A similar trend, however, was noted for pristine SWNTs incubated with HRP. AFM of pristine SWNTs interacting with HRP displayed similar enzyme adsorption. It may be that specific orientations between enzymes and SWNTs in solution promote or inhibit their degradation. Because pristine nanotubes are prone to bundle in solution, it may be that access is limited to the HRP active site. However, previous high-resolution TEM imaging shows exfoliation of larger bundles near the ends. These sites would then be suitable for enzymatic docking and subsequent degradation. Thus, a more probable scenario would be the docking of pristine SWNTs to an alternative hydrophobic site, further separated from the heme active site responsible for oxidation.

As further proof of proximity effects, carboxylated SWNTs were fixated to a quartz substrate and subjected to identical conditions involving HRP and $H_2O_2$. Thin-film UV-Vis-NIR absorption spectroscopy data suggests that no significant degradation of the SWNT film occurred over period of 10 days, presumably due to lack of mobility and spatial confinement of carboxylated SWNTs and adsorbed HRP.

Molecular modeling was used to test theories regarding orientation effects between carboxylated and pristine nanotubes with HRP. These studies and the previously discussed data indicated that strong adsorption of HRP to carboxylated sites facilitates the degradation of carboxylated SWNTs, while the hydrophobic nature of pristine SWNTs forces HRP to orient in a way that increases the distance between the heme active site and the SWNT surface, thus mitigating the enzyme's oxidative effects. Such data indicates heterolytic cleavage of $H_2O_2$ to form Compound I, as opposed to homolytic cleavage facilitated by hemin and $FeCl_3$. Use of either of the latter two species catalyzes the homolytic cleavage of $H_2O_2$, thus forming hydroxyl and hydroperoxyl radicals in a process known as Fenton's catalysis. Moreover, hydroxyl and hydroperoxyl radicals are able to diffuse in solution once formed, and oxidize both carboxylated and pristine SWNT substrates, causing their degradation. Further, the nature of the degradation products have been estimated by HPLC and LC-MS, and the formation of carbon dioxide was established by GC-MS.

Although the studies set forth above establish that functionalized SWNT can be catalytically biodegraded by horseradish peroxidase (HRP) over a period of several weeks, the involvement of peroxidase intermediates generated in mammalian (human) cells and/or biofluids in SWNT biodegradation has not yet been studied. Catalytic systems naturally present in mammals (for example, human) were thus studied for their potential to degrade nanotubes and other nanomaterials, for example, in vivo or in other environmentally sensitive applications.

Neutrophils are bone marrow-derived cells of the innate immune system and they play a key role in the disposal and killing of invading microorganisms. To this end, these cells express oxidant-generating enzymatic activities, including the phagocyte NADPH oxidase and myeloperoxidase (MPO) as well as numerous proteolytic enzymes. Human myeloperoxidase or hMPO, for example, generates potent reactive intermediates and hypochlorous acid. The standard redox potentials of hMPO and its oxoferryl intermediates (compound I/native hMPO, compound I/compound II of hMPO, and compound II/native hMPO) have been determined to be 1.16 V, 1.35 V, and 0.97 V respectively (at pH 7 and 25° C.). As demonstrated herein, neutrophil-derived hMPO, and to a lesser degree human macrophages, have the ability to catalyze the biodegradation of SWNT to products that are inactive as inducers of inflammatory responses in the lung of exposed mice.

Using a reconstituted in vitro model system, the ability of human MPO (hMPO) to oxidatively modify and biodegrade SWNT was tested. In preliminary experiments, it was discovered that SWNT did not inactivate hMPO as assessed by the ability of the enzyme to catalyze one-electron oxidation of ascorbate to EPR-detectable ascorbate radicals. Significant hMPO activity (about 50%) was retained over 2.5 hrs of incubation and decayed after about 5 hrs as assessed by the guaiacol oxidation assay. Based on these estimates, fresh hMPO and $H_2O_2$ were added every 5 hrs to suspensions of SWNT in a number of studies. Visually, the SWNT suspension became increasingly lighter in the course of incubation with hMPO/$H_2O_2$, and turned into a translucent solution after 24 hrs of incubation. In addition, hMPO/$H_2O_2$-induced biodegradation of SWNT was examined by dynamic light scattering analysis (DLS). Particle sizes were determined on the basis of the refractive index of carbon with N,N-dimethylformamide (DMF) as the carrier fluid. A dramatic reduction in size distribution was evident for hMPO/$H_2O_2$-treated SWNT when compared to control. A single peak with a larger size material representing SWNT alone was no longer detectable in hMPO/$H_2O_2$ biodegraded system. Instead, peaks corresponding to smaller size SWNT were found. Mobility profiles of SWNT in loosely cross-linked (0.5%) agarose gel were also examined to evaluate the ability of hMPO/$H_2O_2$ to biodegrade SWNT. The non-degraded SWNT material did not enter the agarose gel and was detectable as a dark congestion on the border of concentrating gels, whereas no presence of biodegraded SWNT incubated with hMPO/$H_2O_2$ (24 hrs) were found in these locations.

Figure 6A:
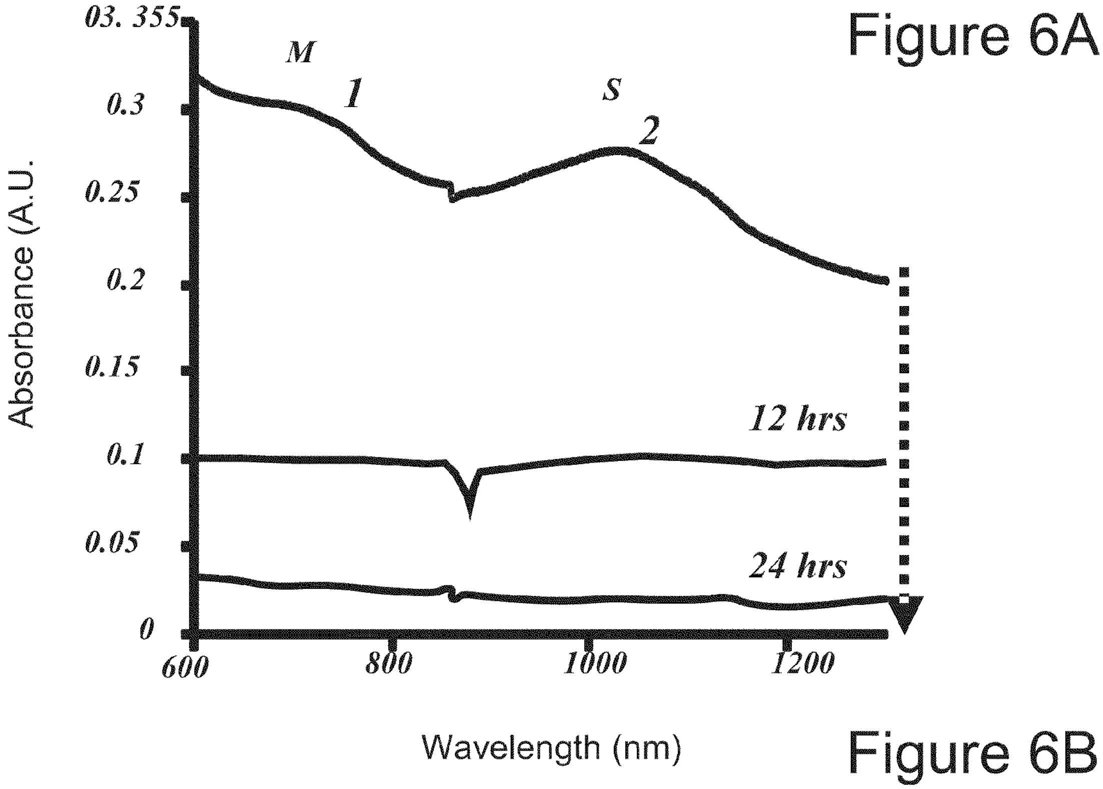
FIG. 6A Vis-NIR spectra of carboxylated SWNTs, before and after incubation with hMPO and $H_2O_2$.
Figure 6B:
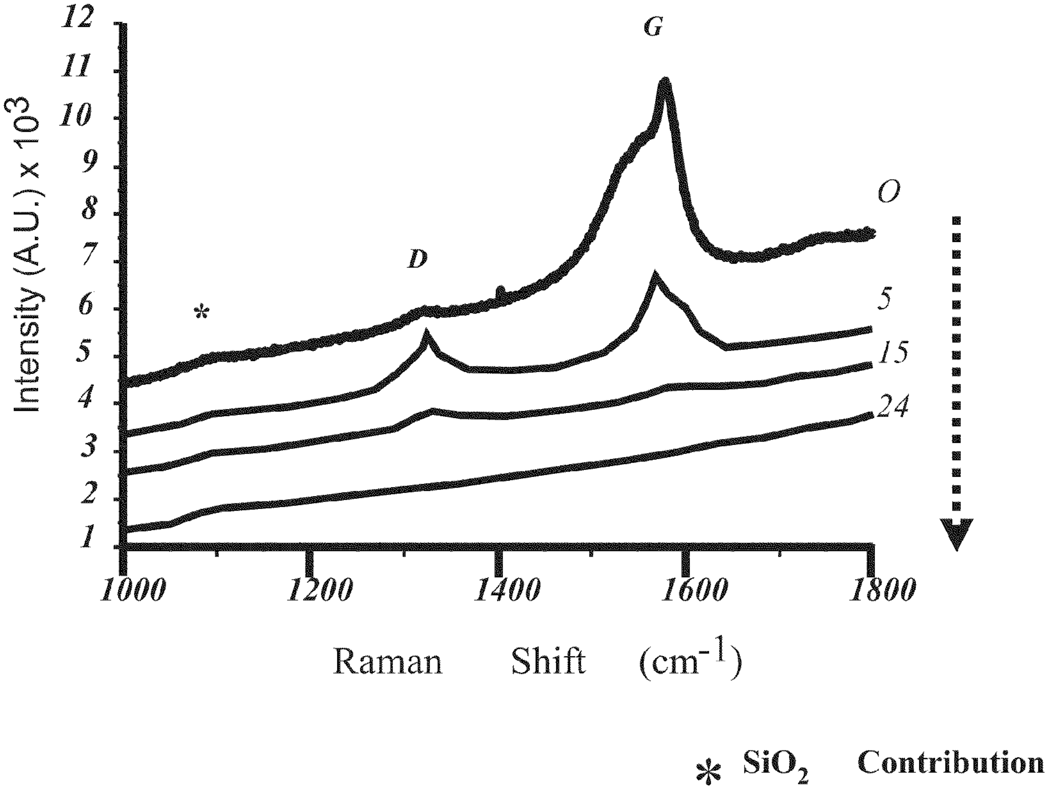
FIG. 6B illustrates Raman spectra of carboxylated SWNTs before and after incubation with hMPO and $H_2O_2$.

Furthermore, in the visible-near-infrared absorbance spectra (Vis-NIR), the characteristic metallic band ($M_1$) and second semiconducting ($S_2$) transition band of SWNT were suppressed entirely by the end of the incubation period (see FIG. 6A), which is compatible with marked oxidative modification of SWNT. Raman spectra of SWNT/hMPO+$H_2O_2$ mixtures were recorded as a function of biodegradation reaction time to examine the effect of MPO/$H_2O_2$ on SWNT. As can be observed in FIG. 6B, the disorder-induced band (D) at around 1250-1350 $cm^{-1}$ showed a substantial increase with the reaction time and the intensity of tangential mode G-band (1400-1700 $cm^{-1}$) substantially decreased with time. Accordingly, the ratio of the D band to the characteristic tangential G band (the D/G ratio) for modified SWNT was augmented, indicative of graphene side-wall oxidation (see FIG. 6B). A maximum in D/G ratio was observed after 5 hrs of incubation with the MPO/$H_2O_2$. After 24 hrs of incubation, a complete loss of characteristic G and D-bands were observed in the Raman spectra. These effects were not detectable if the SWNT were incubated with either hMPO only or $H_2O_2$ only.

Figure 7:
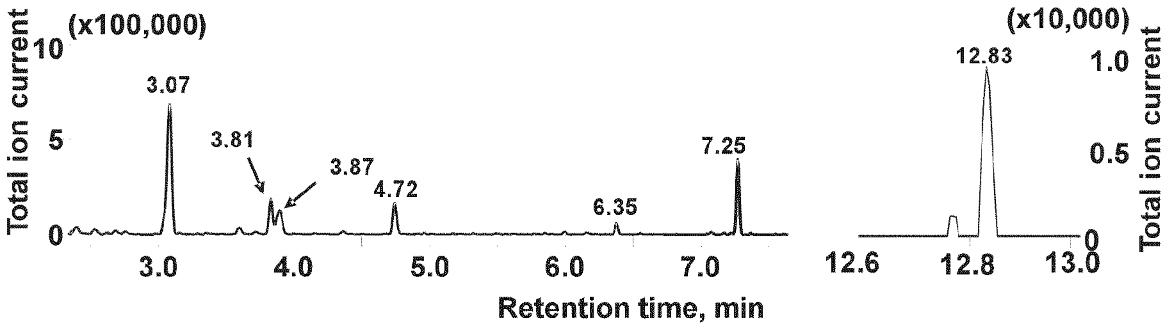
FIG. 7 illustrates a gas chromatography-mass spectroscopy (GC-MS) analysis of products formed during biodegradation of SWNT with hMPO and $H_2O_2$.
Figure 8A:
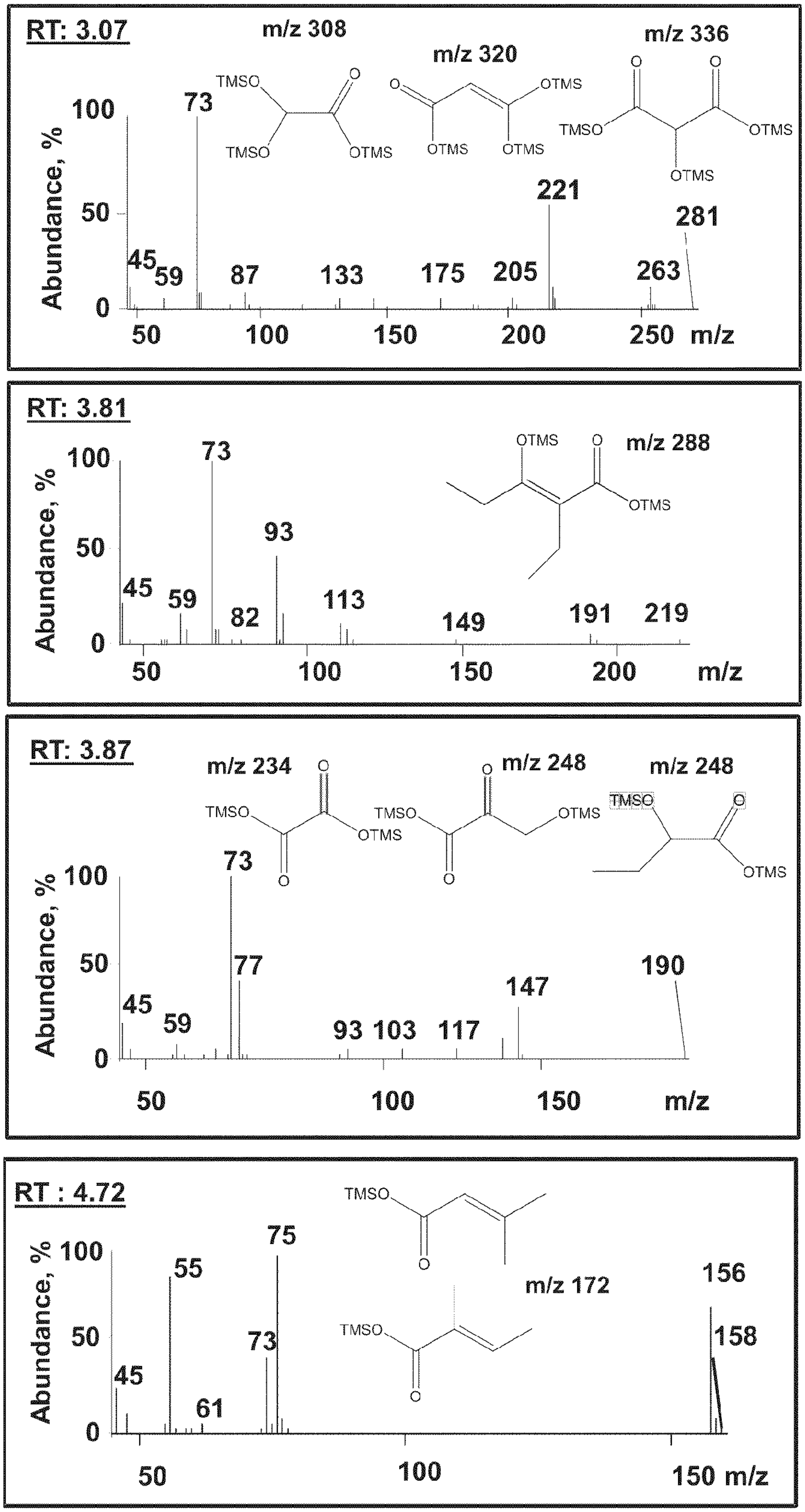
FIG. 8A illustrates MS fragmentation patterns of several SWNT intermediate degradation products.
Figure 8B:
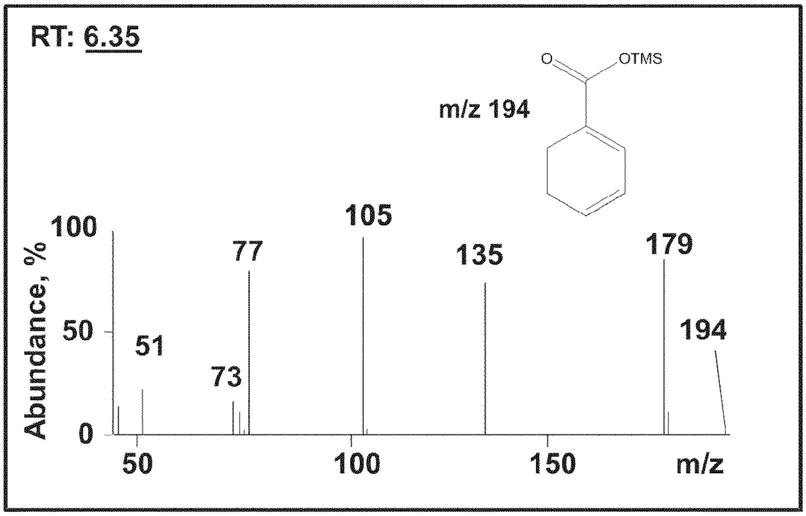
FIG. 8B illustrates MS fragmentation patterns of several other SWNT intermediate degradation products.
Figure 8B:
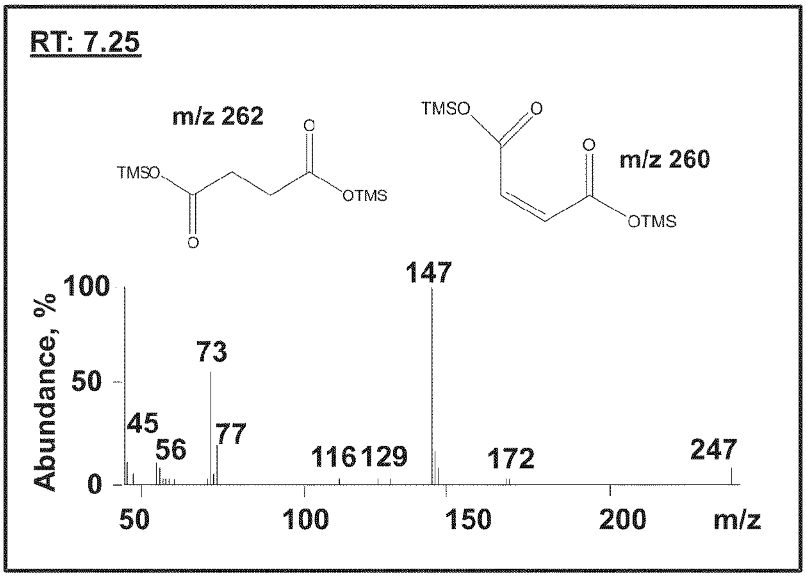
Figure 8B:
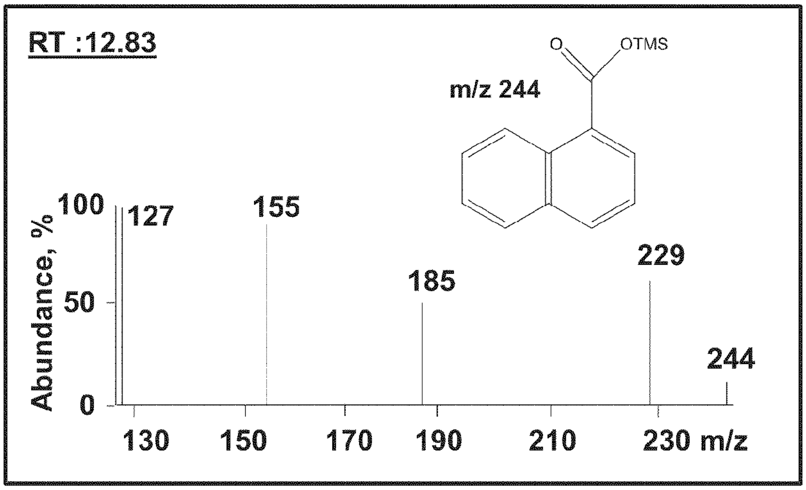

Gas chromatography-mass spectroscopy (GC-MS) analysis of the products formed during biodegradation of SWNT revealed several molecular ions after derivatization with TMS (FIG. 7). Using MS fragmentation and comparisons with the available databases (Shimadzu, Japan), several products of partially biodegraded SWNT were identified as short-chain tri-carboxylated alkanes and alkenes corresponding to molecular ions with m/z 308, 320, 336 and retention time (RT) 3.07 min (see FIGS. 8A and 8B). In addition, molecular ions of di-carboxylated short-chain products with m/z 288 (RT 3.81 min), 234 (RT 3.87 min), 248 (RT 3.87 min), 260 (RT 7.25 min) and 262 (RT 7.25 min) were detected in MS spectra. Mono-carboxylated products of SWNT biodegradation were represented as short fragments with m/z 172 (RT 4.72 min). Molecular ions with m/z 194 and RT of 6.35 min and m/z 244 with RT of 12.83 min were also identified as TMS-derivatives of benzoic acid, the product of benzene carboxylation, and naphthoic acid, a product of naphthalene oxidation, respectively. Analysis of biodegradation products extracted from fully degraded SWNT demonstrated the presence of short-chain carboxylated alkanes and alkenes (data not shown). A 60% increase in $CO_2$ levels was detected in biodegraded samples compared to SWNT incubated with hMPO alone or $H_2O_2$ alone.

Biodegradation of hMPO/$H_2O_2$-treated nanotubes was also confirmed using TEM. Treatment of SWNT with hMPO/$H_2O_2$ resulted in drastic changes of their morphology. The characteristic fibrillar structure of intact SWNT was completely lost with hMPO and $H_2O_2$ and the bulk of the nanotubes were no longer present following 24 hrs of incubation. Only a few visual fields showed some evidence of residual globular. Similarly, scanning electron microscopy (SEM) revealed that exposure to hMPO/$H_2O_2$ caused disappearance of the fibrillar structures that are characteristic for SWNT.

Two types of potent oxidant agents—reactive radical intermediates of hMPO and hypochlorite—can potentially be involved in SWNT biodegradation. Both are formed when hMPO is incubated with $H_2O_2$ in the presence of NaCl whereas only peroxidase reactive intermediates (but not hypochlorite) are generated in the absence of NaCl. It was observed that SWNT biodegradation occurred when SWNT were incubated with hMPO/$H_2O_2$ in the absence of NaCl, albeit markedly suppressed when compared to incubation of nanotubes in the presence of hMPO/$H_2O_2$ plus NaCl. Similarly, when SWNT were exposed to NaOCl—in the absence of hMPO—the degradation process was attenuated. Accordingly, scavenging of HOCl in the incubation system containing MPO/$H_2O_2$ using taurine (10 mM)—known to effectively scavenge hypochlorous acid—impeded the biodegradation process by 55%. Control experiments in which SWNT were incubated in the presence of $H_2O_2$ alone or hMPO alone revealed no signs of biodegradation. These results indicate that peroxidase reactive intermediates as well as hypochlorite contribute to the potent hMPO-driven biodegradation of SWNT.

Interaction sites of hMPO with SWNT were also studied using molecular modeling. In modeling studies were made to determine whether carbon nanotubes would interact with hMPO in proximity to the heme and catalytically essential amino acid residues on hMPO, such as Tyr and Trp. Models of carboxylated and non-carboxylated SWNT were generated and docked to the hMPO crystal structure. The top 25 rank ordered conformations were found to be clustered between two sites on hMPO in both cases. One binding site, preferred based on minimum energy, was located at the proximal end of the heme group involving the proposed catalytically active Tyr293 and the second site was located at the distal end of the heme group on the opposite side of the molecule. The simulation model indicated a strong interaction of positively charged residues on hMPO with the carboxyl surface of (14.0) SWNT, in line with the previous study by Kam et al. which attributed interactions of SWNT with proteins to attractive forces between the carboxyl groups on the SWNT surface and positively charged domains on the proteins. Kam, N. & Dai, H. Single walled carbon nanotubes for transport and delivery of biological cargos. *Phys. stat. sol.* 243, 3561-3566 (2006). Of the list of the top 25 rank-ordered hMPO-bound carboxylated SWNT conformation instances, in 16 of the docked conformations, the carboxylated SWNT ends pointed at three positively charged arginine residues at positions 294, 307 and 507 in hMPO. The conformation where carboxylated SWNT is most buried has a minimum energy of −15.7 kcal/mol as compared to the second binding site which was only observed in 9 of the 25 top-ranked conformation and had a lesser minimum energy of −11.2 kcal/mol. Analysis of the residues located within 5 Å distance from the docked carboxylated SWNT revealed the presence of Tyr293, Arg294, Arg307, Tyr313, Trp513, Trp514 and Arg507 in close proximity to SWNT thus emphasizing their potential involvement in the catalytic act. To test the predicted role of positive charges in the interaction, a triple mutation of R294A/R307A/R507A in silico was introduced. While the SWNT remained docked to the structure, it did so predominantly in an alternative conformation (23/25 conformations) that involves R487 and K488. The binding energy decreased from −15.7 kcal/mol to −14.7 kcal/mol. To further validate the molecular modeling studies, the degree of MPO-mediated biodegradation of non-carboxylated (pristine) vs carboxylated SWNT was evaluated. Pristine SWNT—unlike carboxylated SWNT—were found not to undergo biodegradation within the same incubation period. This result indicates that the carboxyl-groups on SWNT play an important role in promoting catalysis of oxidative SWNT biodegradation.

Without limitation to any particular mechanism, the predicted binding site also allows formulating a hypothesis on the molecular mechanism of this reaction. It has been proposed that radicals of Tyr293 and Trp513 residues are possible catalytic intermediates of the peroxidase reaction. Importantly, Tyr293 and Trp513 are in close proximity—within 5 Å—to the carboxyl group on the SWNT. These residues are in contact with the SWNT ends, suggesting that there might be radical transfer from the heme site to this catalytic active binding site. To test this hypothesis, the hMPO structure was analyzed to identify candidate residues for the radical transfer from the heme pocket to either Tyr293 or Trp513. Out of all tyrosine (12) and tryptophan (10) residues in hMPO, only Tyr334 and Tyr296 are in close proximity (within 4 Å) to the heme. This suggests two possible pathways (1) radical transfer from Tyr334 via Tyr296-Tyr293 and (2) from Tyr296 via Tyr-. A site-localized reaction in which positive charges favor binding of SWNT whereas radical-supporting aromatic groups mediate cleavage can thus be proposed. Experimental data obtained by atomic force microscopy (AFM) of the enzyme co-incubated with SWNT, demonstrated interaction/attachment of hMPO to the surface of carboxylated carbon nanotubes. The interaction between SWNT and hMPO was further assessed using sectional analysis to obtain relative height profiles of hMPO only (13.4 nm), carboxylated SWNTs (1-2 nm), and combined hMPO/SWNT (17.3 nm and 1.1 nm for the complex and bare end of SWNT, respectively).

It was also studied whether oxidative modification leading to biodegradation of SWNT can be executed by neutrophils, which are short-lived immune cells that are a particularly rich source of hMPO. hMPO is highly concentrated in the so-called azurophilic granules in neutrophils and is released into the extracellular compartment in an inflammatory setting. Therefore, SWNT biodegradation by hMPO may potentially include both intracellular and extracellular reactions. In neutrophils isolated from buffy coats from healthy adult blood donors, it was estimated that about one quarter (24%) of the total hMPO was released extracellularly upon stimulation with Formyl-Methionyl-Leucyl-Phenylalanine (fMLP) and cytochalasin B while three-quarters (76%) of the total amount of hMPO retained its intracellular localization. Based on this observation, SWNT was targeted to the intracellular compartment of neutrophils to maximize the potential biodegradation of these materials. To facilitate the internalization of carbon nanotubes by neutrophils, fluorescently labeled FITC-SWNT were prepared and opsonized with IgG, a well known mediator of Fcγ-receptor-dependent internalization of microorganisms and particles by phagocytic cells. This functionalization resulted in a 3-fold increase in the uptake of IgG-coated FITC-SWNT by neutrophils when compared to non-opsonized FITC-SWNT. The augmentation of FITC-labeled SWNT phagocytosis by neutrophils was revealed by both confocal and transmission electron microscopy. hMPO-driven biodegradation of carbon nanotubes in human neutrophils and monocyte-derived macrophages is enhanced upon opsonization.

In neutrophils activated by ingestion of bacteria and other foreign particles, hMPO is translocated into phagosomes where the fully assembled, membrane-bound NADPH oxidase generates superoxide radicals. The latter dismutate to $H_2O_2$ that enables hMPO to produce reactive intermediates and HOCl (using chloride ions). Based on dihydroethidium (DHE) staining as well as the cytochrome c reduction assay, it was observed that activation of neutrophils indeed took place upon stimulation with fMLP. Moreover, neutrophils treated with IgG-coated SWNT also generated superoxide. In addition, the generation of $H_2O_2$ by neutrophils incubated with fMLP or IgG-coated SWNT in the presence or absence of fMLP was detected using the Amplex Red assay.

It was also observed that activated neutrophils were able to induce oxidative degradation of SWNT. Isolated neutrophils (25 million cells) from buffy coats of normal healthy donors were incubated with several doses of non-coated SWNT and IgG-coated SWNT. A 100% degradation of 25 μg of IgG-coated SWNT and 30% degradation of the same dose of non-coated SWNT occurred in PMNs (that is, polymorphonuclear cells such as human neutrophils) as evidenced by the disappearance of characteristic Vis-NIR spectral features of SWNT within 12 hrs of incubation time. Using Raman spectroscopy/microscopy, biodegradation of SWNT in PMNs that was markedly enhanced by opsonization of SWNT with IgG was observed. The characteristic Raman peaks of the SWNT were found to be; G+ and G− bands (~1590 cm-1 and ~1570 cm-1 respectively) and the D band (~1350 cm-1). At 2 hrs time point, PMNs showed no signs of degradation which is indicated by the presence of the prototypical G and D bands. However, the Raman spectra of SWNT in PMNs at 8 hours, showed signs of degradation. The Raman spectra of these degraded SWNT were no longer that of native or pristine SWNT spectra but had features characteristic of oxidatively biodegraded SWNT—decreased magnitude of G band and relatively higher intensity of D band—resembling those of carbon black. At 2 hrs, a large amount of SWNT could be seen in PMNs. However, at the later time points, there were less SWNT in the neutrophils, and they appeared to have formed bundles located within the cytosol of the cells.

Inhibitors of MPO and NADPH oxidase were used to evaluate the involvement of these enzymatic systems in SWNT biodegradation in PMNs. NADPH oxidase can act as a potential source for superoxide/$H_2O_2$ fueling the MPO-driven degradation reaction. 4-aminobenzoic acid hydrazide (ABAH), which irreversibly inactivates MPO in the presence of $H_2O_2$ and inhibits HOCl production, was used. ABAH has been shown to be cytotoxic to PMNs, hence it was used at a relatively low non-toxic concentration (20 μM). At the low concentration used, ABAH caused partial (60%) inhibition of MPO mediated biodegradation of IgG-SWNT in PMNs (10 μg/10 million cells/mL) as evidenced by Vis-NIR spectroscopy. In another set of experiments, a NADPH oxidase inhibitor, apocynin (2 mM) was used. The latter is known to inhibit the production and release of superoxide anion by blocking the migration of $p47^{phox}$, a sub-unit of the enzymatic complex, to the membrane upon oxidation of apocynin to diapocynin by MPO/$H_2O_2$. The Vis-NIR measurements revealed that IgG-SWNT biodegradation of SWNT in PMNs was also sensitive to apocynin. The degradation of IgG-SWNT in PMNs (10 g/10 million cells/mL) was inhibited by 85% under the conditions used. This corresponds with the known high activities of both MPO and NADPH oxidase in neutrophils. Thus both NADPH oxidase and MPO function in the process of SWNT biodegradation in PMNs. These results support the conclusion that the mechanism of biodegradation of SWNT inside PMNs occurs through oxidation-driven pathway. Moreover, it is conceivable that the IgG-enhanced uptake of SWNT by PMNs serves to facilitate the MPO-driven biodegradation process through activation of the NADPH oxidase-dependent oxidative burst leading to $H_2O_2$ production in the cells.

Experiments using human monocyte-derived macrophages—known to contain lower levels of MPO than PMNs were also preformed. Cells were incubated with either SWNT or IgG-coated SWNT under standard experimental conditions. After 12 hrs incubation, there was almost no degradation of either SWNT or IgG-coated SWNT by macrophages whereas SWNT degradation by PMNs was nearly complete as assessed by Vis-NIR measurements. However over an extended time period of 48 hrs, macrophages also showed capability of degrading IgG-coated SWNT (80% degradation based on Vis-NIR spectra); notably, a 30% enhanced degradation of IgG-SWNT over SWNT was detected in macrophages after 48 hrs. Overall, these results indicated that the degree of uptake as well as the content/activity of MPO within the cells are determinants of biodegradation of SWNT.

SWNT can physically adsorb different biomolecules, including phospholipids and proteins, yielding non-covalent coatings that may affect SWNT interactions with cells. Experiments were performed in which MPO-driven biodegradation of SWNT was pre-coated with either IgG or phospholipids-phosphatidylcholine (PC) or phosphatidylserine (PS); the latter has been shown to avidly bind MPO. The degree of biodegradation of surface coated SWNT was evaluated in both model biochemical systems as well as in PMNs. In a cell-free system, PS-coating of SWNT stimulated catalysis of their biodegradation and required lower amounts of MPO than the non-coated SWNT, IgG-coated SWNT and PC-coated SWNT. In contrast, the PS coating did not expedite the particle degradation in PMNs, indicating that PS might not be a preferred signaling molecule for uptake by PMNs. Interestingly, coating of SWNT with IgG compared to non-coated SWNT hindered the degradation in a cell-free system, but in PMNs it enhanced the process of biodegradation via promotion of their uptake likely via Fcγ-receptors on PMNs. On the other hand, PC coating thwarted the process of biodegradation both in a cell-free system and in PMNs.

Pharyngeal aspiration or inhalation of SWNT is known to induce a robust pulmonary inflammatory response with unusually short acute phase and early onset of fibrosis. Considering that hMPO can oxidatively modify carbon nanotubes, it was studied whether the biodegradation process would be sufficient to render SWNT inactive in terms of eliciting the characteristic inflammatory pulmonary responses in vivo in mice. An established mouse model of pharyngeal aspiration of SWNT was used in several studies. For example, the numbers of neutrophils, the amount of pro-inflammatory (TNF-α) and anti-inflammatory (IL-6) cytokines in broncheoalveolar lavage (BAL) obtained from mice at 1 day (FIG. 8A) or 7 days (data not shown) post-exposure were assessed. The profiles of these inflammation markers in animals exposed to SWNT that have been biodegraded in vitro by hMPO/$H_2O_2$ were essentially indistinguishable from the control values observed in non-exposed mice. In contrast, intact SWNT elicited an acute inflammatory response as demonstrated by marked elevation of the levels of the aforementioned biomarkers, and this response was not significantly affected by pre-incubation of SWNT with either hMPO alone or $H_2O_2$ alone. Non-degraded SWNT also induced the formation of tissue granulomas whereas no granulomas were observed in the lung of mice exposed to biodegraded SWNT.

Experiments were also conducted employing partially degraded SWNT to assess their ability and potency to cause inflammation in mice. According to TEM, the partially MPO-degraded SWNT (incubated with MPO/$H_2O_2$ for 10 hrs under standard conditions) were shorter than native SWNT (95±25 nm vs 600±30 nm in controls) and had increased D/G ratio as seen in the Raman spectra. The partially degraded SWNT induced inflammatory responses in mice after pharyngeal aspiration, albeit much less effectively than non-biodegraded SWNT. Thus, partially biodegraded SWNT that still retain their characteristic features can be converted into less toxic entities, as judged by their ability to invoke pulmonary inflammation in an established mouse model. Together, these experiments show that hMPO-mediated biodegradation serves to mitigate the pro-inflammatory potential of SWNT.

Notwithstanding these observations, the exposure of mice to carbon nanotubes is known to elicit pulmonary inflammation. Ineffective internalization of non-functionalized SWNT by phagocytic cells may, for example, preclude the effective biodegradation of these materials. The biodegradation experiments reported above using isolated human neutrophils and IgG-coated SWNT versus non-functionalized SWNT support this hypothesis. In addition, the capacity of the described biodegradation system could be overwhelmed by the doses of SWNT that are commonly utilized in inhalation or pharyngeal aspiration experiments. It has previously been observed that the combined exposure to SWNT and bacterial infection (*Listeria monocytogenes*) was associated with a more severe inflammatory response in the lungs of exposed mice, possibly indicating that part of the natural SWNT-biodegrading capacity of hMPO might have been devoted to the handling of microbial targets. The latter observation suggests that pre-existing infection or other challenges to the innate immune system may be important in determining the pulmonary responses to SWNT.

SWNT and other carbon nanomaterials possess several remarkable and potentially useful properties, making them attractive candidates for biomedical and other applications. However, pronounced biopersistence is a major impediment in the in vivo application of these versatile materials. The results set forth herein identify approaches to employ hMPO catalysis for the directed biodegradation of carbon nanotubes/nanomaterials in biofluids/tissues. Moreover, the propensity of, for example, SWNT to undergo hMPO-mediated biodegradation indicates that this class of engineered nanomaterials may be considered as tools for delivery of therapeutic agents, when utilized at appropriate and readily degradable concentrations.

The foregoing description and accompanying drawings set forth embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of degrading carbon nanomaterials, comprising: mixing the carbon nanomaterials with a composition comprising a peroxide substrate and at least one catalyst selected from the group of an enzyme and an enzyme analog, the peroxide substrate undergoing a reaction in the presence of the catalyst to produce an agent interactive with the carbon nanomaterials to degrade the carbon nanomaterials.

2. The method of claim 1 wherein the peroxide substrate is hydrogen peroxide or an organic peroxide and the agent is oxidative.

3. The method of claim 2 wherein the catalyst comprises a transition metal.

4. The method of claim 3 wherein the transition metal is iron.

5. The method of claim 1 wherein the enzyme is a metal peroxidase or a laccase.

6. The method of claim 5 wherein the enzyme is horseradish peroxidase or a myeloperoxidase.

7. The method of claim 1 wherein the carbon nanomaterials are functionalized.

8. The method of claim 1 wherein the carbon nanomaterials are carboxylated.

9. The method of claim 1 wherein the catalyst is an enzyme naturally occurring in plants or animals.

10. The method of claim 9 wherein the enzyme naturally occurs in mammals.

11. The method of claim 10 wherein the enzyme naturally occurs in humans.

12. The method claim 10 wherein the enzyme is a myeloperoxidase.

13. The method of claim 12 wherein the myeloperoxidase is present within a substance.

14. The method of claim 13 wherein the myeloperoxidase is present within a neutrophil or a macrophage.

15. The method of claim 1 wherein the carbon nanomaterials are carbon nanotubes.

16. The method of claim 15 wherein the carbon nanotubes are single walled carbon nanotubes.

17. The method of claim 15 wherein the carbon nanotubes are functionalized.

18. The method of claim 15 wherein the carbon nanotubes are carboxylated.

19. The method of claim 1 wherein the degradation occurs at ambient conditions.

* * * * *